United States Patent
Yuan et al.

(10) Patent No.: US 11,789,697 B2
(45) Date of Patent: *Oct. 17, 2023

(54) METHODS AND SYSTEMS FOR ATTENDING TO A PRESENTING USER

(71) Applicant: GOOGLE LLC, Mountain View, CA (US)

(72) Inventors: Yuan Yuan, San Jose, CA (US); Johan Schalkwyk, Sunnyvale, CA (US); Kenneth Mixter, Los Altos Hills, CA (US)

(73) Assignee: Google LLC, Mountain View, CA (US)

(*) Notice: Subject to any disclaimer, the term of this patent is extended or adjusted under 35 U.S.C. 154(b) by 188 days.

This patent is subject to a terminal disclaimer.

(21) Appl. No.: 17/370,656

(22) Filed: Jul. 8, 2021

(65) Prior Publication Data
US 2021/0334070 A1    Oct. 28, 2021

Related U.S. Application Data

(63) Continuation of application No. 16/758,144, filed as application No. PCT/US2018/046654 on Aug. 14, 2018, now Pat. No. 11,086,597.
(Continued)

(51) Int. Cl.
*G10L 15/22* (2006.01)
*G06F 3/16* (2006.01)
(Continued)

(52) U.S. Cl.
CPC ............ *G06F 3/167* (2013.01); *G06F 3/165* (2013.01); *G06V 40/174* (2022.01); *G10L 15/22* (2013.01); *H04N 7/142* (2013.01); *H04N 7/15* (2013.01)

(58) Field of Classification Search
CPC ........ G01S 3/7865; G06F 3/012; G06F 3/165; G06F 3/167; G06V 40/174; G06V 10/82;
(Continued)

(56) References Cited

U.S. PATENT DOCUMENTS

| 6,072,522 A * | 6/2000 | Ippolito ............... H04N 7/142 |
|               |        | 348/E7.083 |
| 6,538,666 B1 | 3/2003 | Ozawa et al. |

(Continued)

FOREIGN PATENT DOCUMENTS

| CN | 102843540 B | 7/2015 |
| EP | 2492850 A1 | 8/2012 |
| WO | WO-2007041295 A2 | 4/2007 |

OTHER PUBLICATIONS

Notification of First Office Action for CN 201880033439.0 dated Dec. 5, 2022, 20 pages.
(Continued)

*Primary Examiner* — Gerald Gauthier
(74) *Attorney, Agent, or Firm* — Kilpatrick Townsend & Stockton LLP

(57) ABSTRACT

The various implementations described herein include methods, devices, and systems for attending to a presenting user. In one aspect, a method is performed at an electronic device that includes an image sensor, microphones, a display, processor(s), and memory. The device (1) obtains audio signals by concurrently receiving audio data at each microphone; (2) determines based on the obtained audio signals that a person is speaking in a vicinity of the device; (3) obtains video data from the image sensor; (4) determines via the video data that the person is not within a field of view of the image sensor; (5) reorients the electronic device based on differences in the received audio data; (6) after reorienting the electronic device, obtains second video data from the
(Continued)

image sensor and determines that the person is within the field of view; and (7) attends to the person by directing the display toward the person.

20 Claims, 14 Drawing Sheets

Related U.S. Application Data

(60) Provisional application No. 62/582,147, filed on Nov. 6, 2017.

(51) Int. Cl.
  *H04N 7/14* (2006.01)
  *H04N 7/15* (2006.01)
  *G06V 40/16* (2022.01)

(58) Field of Classification Search
  CPC ....... G10L 15/22; H04M 1/0254; H04N 5/91; H04N 7/142; H04N 7/147; H04N 7/15; H04N 13/167; H04N 21/4788; H04N 23/62; H04N 23/651; H04N 23/69; H04N 23/64; H04N 23/959; A61F 2/14; G02C 7/04; G06K 7/107; G06T 7/80; G09B 19/24; G09G 3/32
  See application file for complete search history.

(56) References Cited

U.S. PATENT DOCUMENTS

| | | | |
|---|---|---|---|
| 6,593,956 B1* | 7/2003 | Potts | G01S 3/7865 |
| | | | 348/E7.083 |
| 6,914,622 B1* | 7/2005 | Smith | H04N 7/15 |
| | | | 348/E7.083 |
| 7,027,659 B1 | 4/2006 | Thomas | |
| 8,011,583 B2* | 9/2011 | Lei | G06K 7/10712 |
| | | | 235/438 |
| 8,125,405 B2 | 2/2012 | Dove et al. | |
| 8,296,151 B2 | 10/2012 | Klein et al. | |
| 9,432,768 B1 | 8/2016 | O'Neill et al. | |
| 9,469,030 B2 | 10/2016 | Wang et al. | |
| 9,635,072 B1 | 4/2017 | Murphy et al. | |
| 9,712,738 B2* | 7/2017 | Van Heugten | H04N 23/959 |
| 9,942,513 B1 | 4/2018 | Aarrestad et al. | |
| 9,992,451 B2 | 6/2018 | Ono et al. | |
| 10,140,515 B1 | 11/2018 | Waldo et al. | |
| 10,602,117 B1* | 3/2020 | Côté | G09B 19/24 |
| 11,086,597 B2* | 8/2021 | Yuan | G06F 3/165 |
| 2008/0180519 A1 | 7/2008 | Cok | |
| 2010/0118112 A1* | 5/2010 | Nimri | H04N 7/142 |
| | | | 348/E7.083 |
| 2011/0082690 A1 | 4/2011 | Togami et al. | |
| 2011/0134205 A1* | 6/2011 | Arney | H04N 21/4788 |
| | | | 348/E5.022 |
| 2012/0320143 A1* | 12/2012 | Chu | H04N 7/15 |
| | | | 348/E7.083 |
| 2013/0002794 A1* | 1/2013 | Hines | H04N 13/167 |
| | | | 348/E7.078 |
| 2013/0300820 A1* | 11/2013 | Liu | H04N 7/15 |
| | | | 348/14.05 |
| 2013/0342638 A1* | 12/2013 | Sobti | H04M 1/0254 |
| | | | 455/575.1 |
| 2014/0172432 A1 | 6/2014 | Sendai et al. | |
| 2015/0019226 A1 | 1/2015 | Gazdzinski | |
| 2015/0073646 A1 | 3/2015 | Rosenstein et al. | |
| 2015/0195489 A1* | 7/2015 | Sobti | H04N 7/142 |
| | | | 348/14.08 |
| 2015/0288923 A1* | 10/2015 | Kim | H04N 23/62 |
| | | | 348/14.05 |
| 2015/0301338 A1* | 10/2015 | Van Heugten | G09G 3/32 |
| | | | 345/8 |
| 2015/0331490 A1 | 11/2015 | Yamada et al. | |
| 2015/0331664 A1 | 11/2015 | Osawa et al. | |
| 2016/0028878 A1 | 1/2016 | Davis et al. | |
| 2016/0057385 A1* | 2/2016 | Burenius | H04N 7/147 |
| | | | 348/14.16 |
| 2016/0124501 A1 | 5/2016 | Lam et al. | |
| 2016/0127641 A1* | 5/2016 | Gove | H04N 23/651 |
| | | | 348/143 |
| 2016/0175091 A1* | 6/2016 | Van Heugten | A61F 2/14 |
| | | | 623/6.22 |
| 2016/0286133 A1* | 9/2016 | Chen | H04N 23/69 |
| 2016/0313963 A1* | 10/2016 | Kang | G06F 3/167 |
| 2017/0094179 A1* | 3/2017 | Bellamy | H04N 5/91 |
| 2017/0272838 A1* | 9/2017 | Glazer | G06F 3/012 |
| 2017/0308742 A1 | 10/2017 | Yao et al. | |
| 2018/0260187 A1 | 9/2018 | Yasuda | |
| 2018/0309957 A1 | 10/2018 | Baldwin et al. | |
| 2020/0285443 A1* | 9/2020 | Yuan | H04N 7/142 |
| 2020/0394804 A1* | 12/2020 | Barton | G06V 10/82 |
| 2020/0400957 A1* | 12/2020 | Van Heugten | G02C 7/04 |
| 2021/0334070 A1* | 10/2021 | Yuan | G06F 3/165 |
| 2022/0122431 A1* | 4/2022 | Barton | G06T 7/80 |

OTHER PUBLICATIONS

Google LLC, International Search Report and Written Opinion, PCT/US2018/046654, dated Oct. 30, 2018, 10 pgs.

* cited by examiner

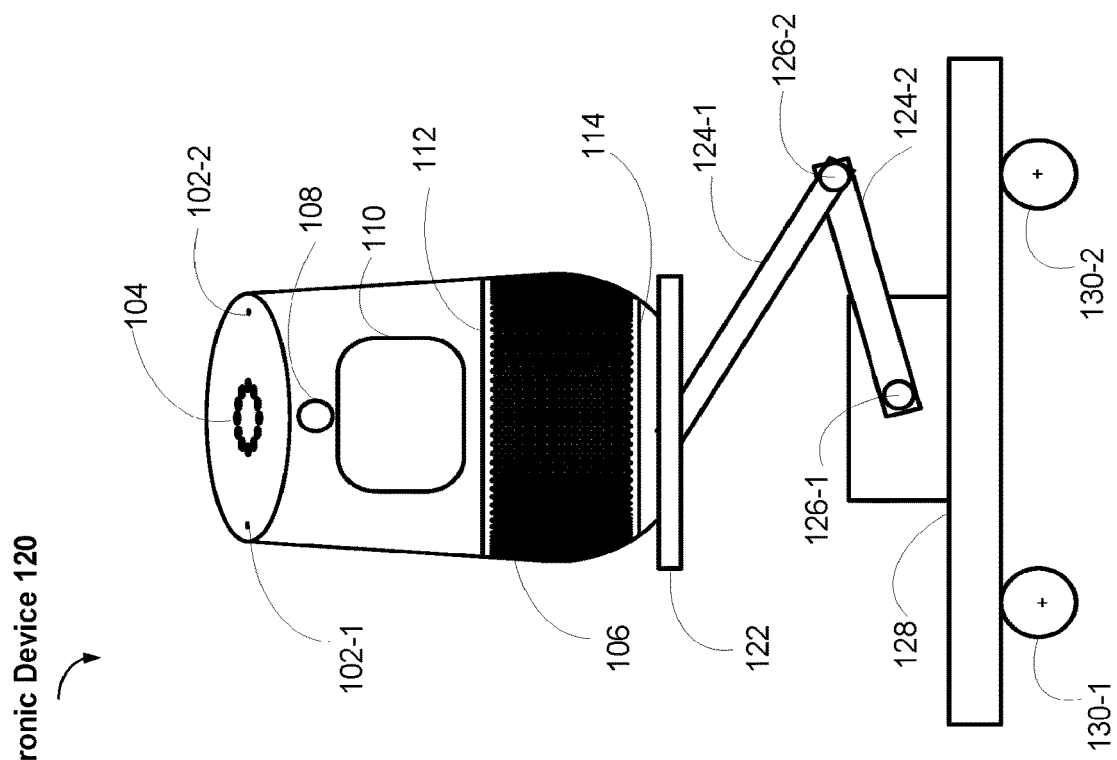
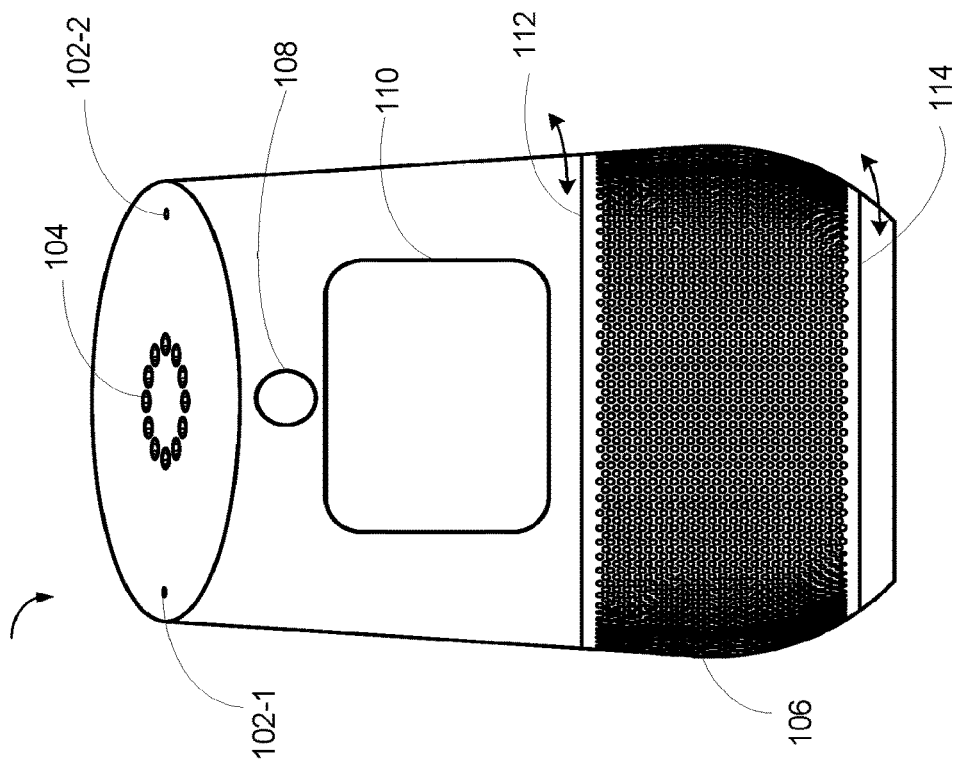
Figure 1B
Figure 1A

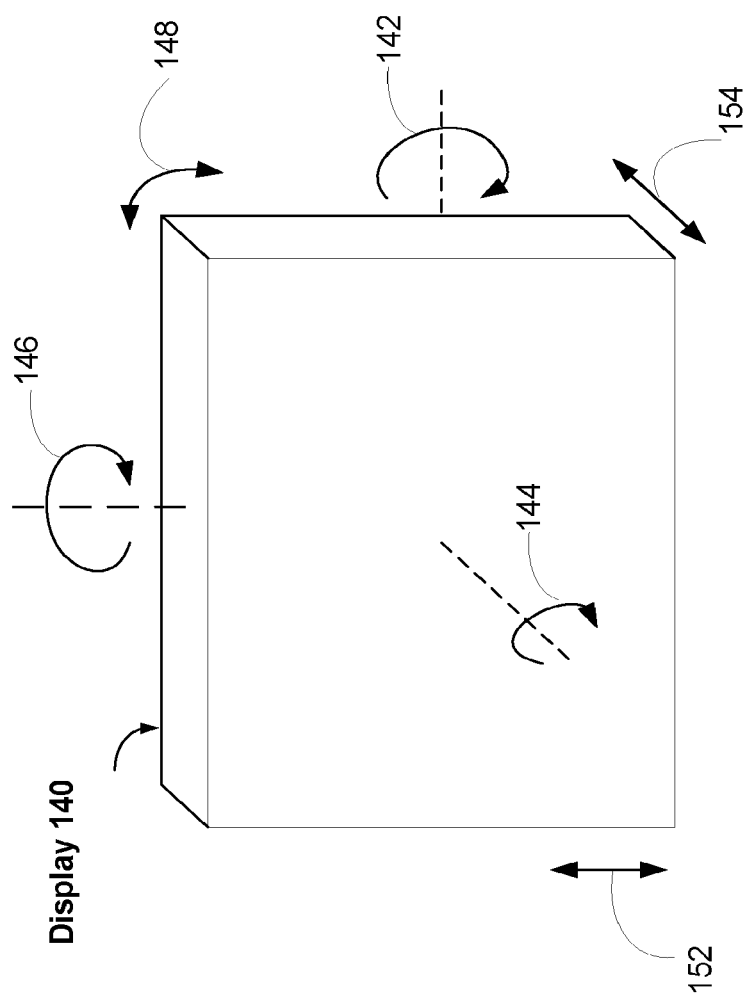

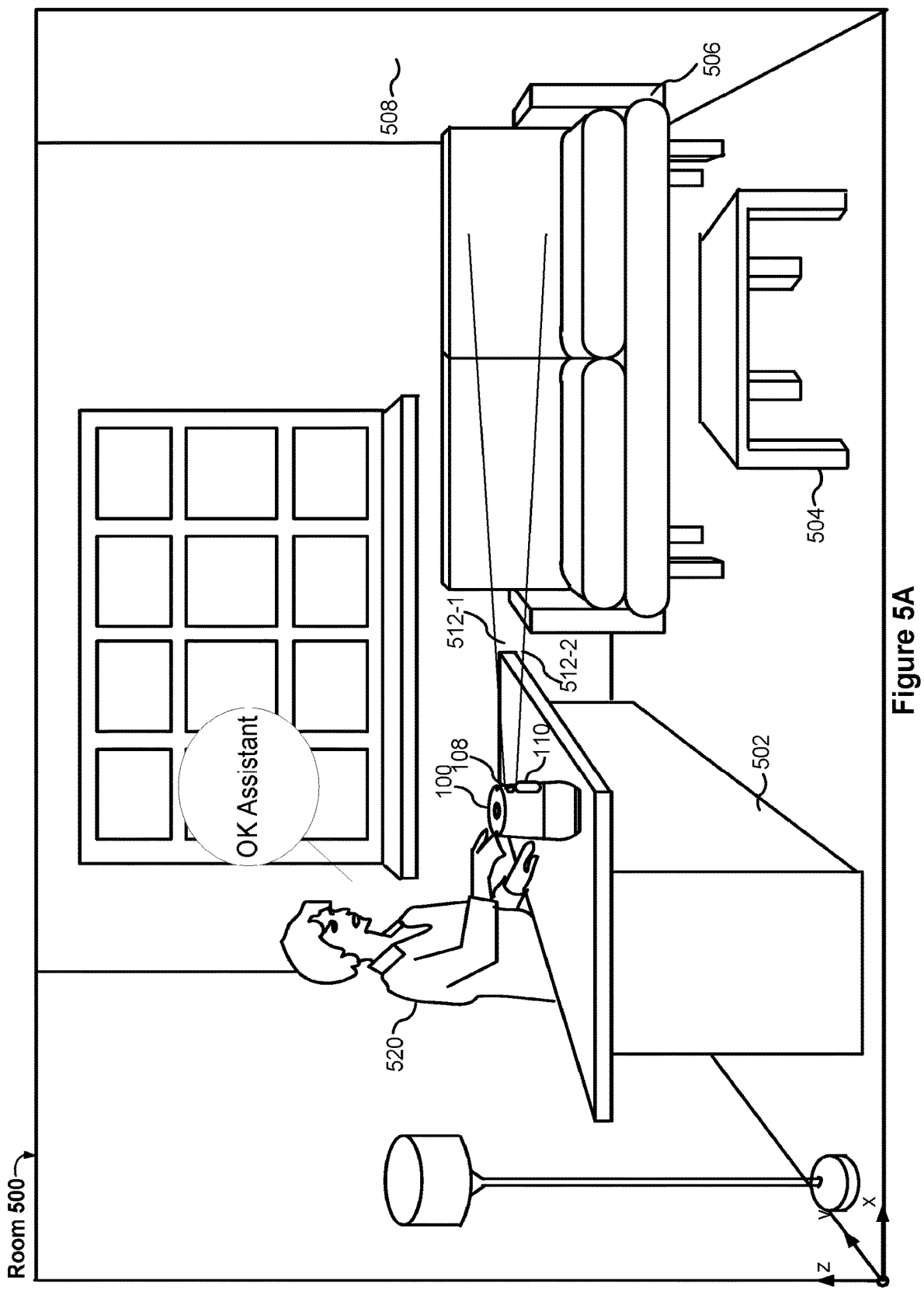

METHODS AND SYSTEMS FOR ATTENDING TO A PRESENTING USER

CROSS-REFERENCE TO RELATED APPLICATIONS

This application is a continuation of U.S. Ser. No. 16/758,144, filed Apr. 22, 2020, which is a U.S. National Phase of International Patent Application No. PCT/IB2018/046654, filed Aug. 14, 2018, which claims priority to U.S. Provisional Application No. 62/582,147, filed Nov. 6, 2017, all of which are hereby incorporated by reference in their entireties.

FIELD

This relates generally to automated assistants, including but not limited to methods and systems for attending to speaking person(s) in a room with an automated assistant.

BACKGROUND

Electronic devices integrated with microphones and cameras are widely used to collect audio and visual data from users and implement voice-activated functions according to voice inputs. Devices are increasingly capable of accessing and presenting information to users. However, devices presenting visual information must be oriented toward a user in order for the user to view the presented information. This can be problematic for users who move between to different locations around the device.

Accordingly, it is desirable to employ an electronic device that is integrated with microphones and cameras to locate and orient on speaking person(s) in a room. For automated assistant devices, it is also desirable that they attend to users who are addressing them.

SUMMARY

There is a need for methods, devices, and systems to locate and attend to speaking persons in a room. Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to automatically (without user inputs) locate and attend to a speaking person. For example, there is a need for electronic devices that respond to both audio and visual user inputs. By locating user(s), indicating that they are listening to the user(s), and presenting visualizations to the user(s) in settings such as video conferences, these electronic devices create efficient and enhanced interactive experiences with users. Further, it is desirable for the electronic devices to show attention to a speaking person with mannerisms that will also seem natural to the user.

For example, an automated assistant device can be used to interact with user(s) via both audio and visual mediums. Such an assistant device can also use the audio and visual inputs to locate the users and attend to them (e.g., reorient itself to better receive information from the user and/or better present information to the user). This improves the user's experience as the user does not need to move to a particular location to view display data on the device, nor does the user need to reorient the device manually.

Electronic devices integrated with microphones and cameras are widely used to collect audio and visual inputs from users. By combining multiple sensing technologies, these electronic devices can find a user in a room with high accuracy and low latency.

The described implementations have an advantage over user localization methods based purely on audio signals, which have issues associated with finding paths to the user which may be non-direct. For example, in the case of a hard wall or surface behind a device, the device may find the path to the user as the path reflecting off the back wall.

In some implementations, an electronic device with multiple microphones and motor-mounted wide-lens camera is employed to locate user(s), e.g., to indicate that the device is listening to the user(s) or to obtain visualization of user(s) for video conferencing.

In some implementations, the user addresses the device with a known hotword/keyword. In some implementations, the device is configured to identify the speaking user. In some implementations, the device is configured to recognize the speaking user.

In some implementations, in response to detecting a hotword from a user, the device obtains video data from a camera of the device and determines based on the video data that the user is in the field of view of the camera. In some implementations, in accordance with a determination that the user is in the field of view of the camera, the device centers the user in the field of view of the camera.

In some instances, however, the user who is speaking is not in the field of view of the camera. In some implementations, after determining that the user is not in the field of view of the camera, the device reorients to look for the user. In some implementations, the device decides where to look based on beamforming of the audio received when user issued the hotword to the device. In some implementations, the device: (i) creates multiple hotword beams, (ii) identifies the beam that has the highest signal-to noise ratio, and (iii) locates the user in the direction of the beam with the highest signal-to-noise ratio. In some implementations, if the user is not located in the direction of the beam with the highest signal-to-noise ratio, the device proceeds to look in the direction of the beam with the second highest signal-to-noise ratio. In some implementations, the device can adaptively subdivide, looking up and down as well as left and right, by checking additional non-horizontal beams for power.

For example, a user John addresses the device with a hotword ("OK assistant.") The device recognizes that the user is John by his voice, but does not see John in the camera's view. The device determines that hotword energy is mostly coming from a direction that is behind and above the device, and accordingly, rotates and tilts the camera in the direction of the hotword energy. The device finds John's face and centers the camera, assuring John that the device is attending to him.

Accordingly, by combining multiple advanced audio and visual sensing technologies, the device is able to find the user with high accuracy and low latency. In some implementations, the device's mannerisms when looking for the user also seem natural to the user, thus improving the user interactions with the device.

In one aspect, some implementations include a method of attending to a presenting user performed at an electronic device having an image sensor, a plurality of microphones, a display, one or more processors, and memory. The method includes: (1) obtaining audio signals by concurrently receiving audio data at each microphone of the plurality of microphones; (2) determining based on the obtained audio signals that a person is speaking in a vicinity of the electronic device; (3) obtaining video data from the image sensor; (4) determining based on analysis of the video data that the person is not within a field of view of the image sensor; (5) reorienting the electronic device based on differences in the audio data received at respective microphones of the plurality of microphones; (6) after reorienting the electronic device, obtaining second video data from the image sensor and determining from the second video data that the person is within the field of view of the image sensor; and (7) attending to the person by directing the display toward the person. In some implementations, the display includes a screen (e.g., a touch screen), one or more LEDs, and/or a user interface with one or more affordances.

In another aspect, some implementations include a computing system including one or more processors and memory coupled to the one or more processors, the memory storing one or more programs configured to be executed by the one or more processors, the one or more programs including instructions for performing any of the methods described herein.

In yet another aspect, some implementations include a non-transitory computer-readable storage medium storing one or more programs for execution by one or more processors of a computing system, the one or more programs including instructions for performing any of the methods described herein.

Thus, devices, storage mediums, and computing systems are provided with methods for attending to speaking users in a room, thereby enhancing user interactions (e.g., improving accuracy and/or efficiency in the interactions) and user satisfaction with such systems. Such methods may complement or replace conventional methods for interacting with users.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIGS. 1A-1C illustrate representative electronic devices and displays for attending to a speaking user, in accordance with some implementations.

FIGS. 5A-5B illustrate a representative operation of the electronic device of FIG. 3, in accordance with some implementations.

Like reference numerals refer to corresponding parts throughout the several views of the drawings.

DETAILED DESCRIPTION

Figure 2:
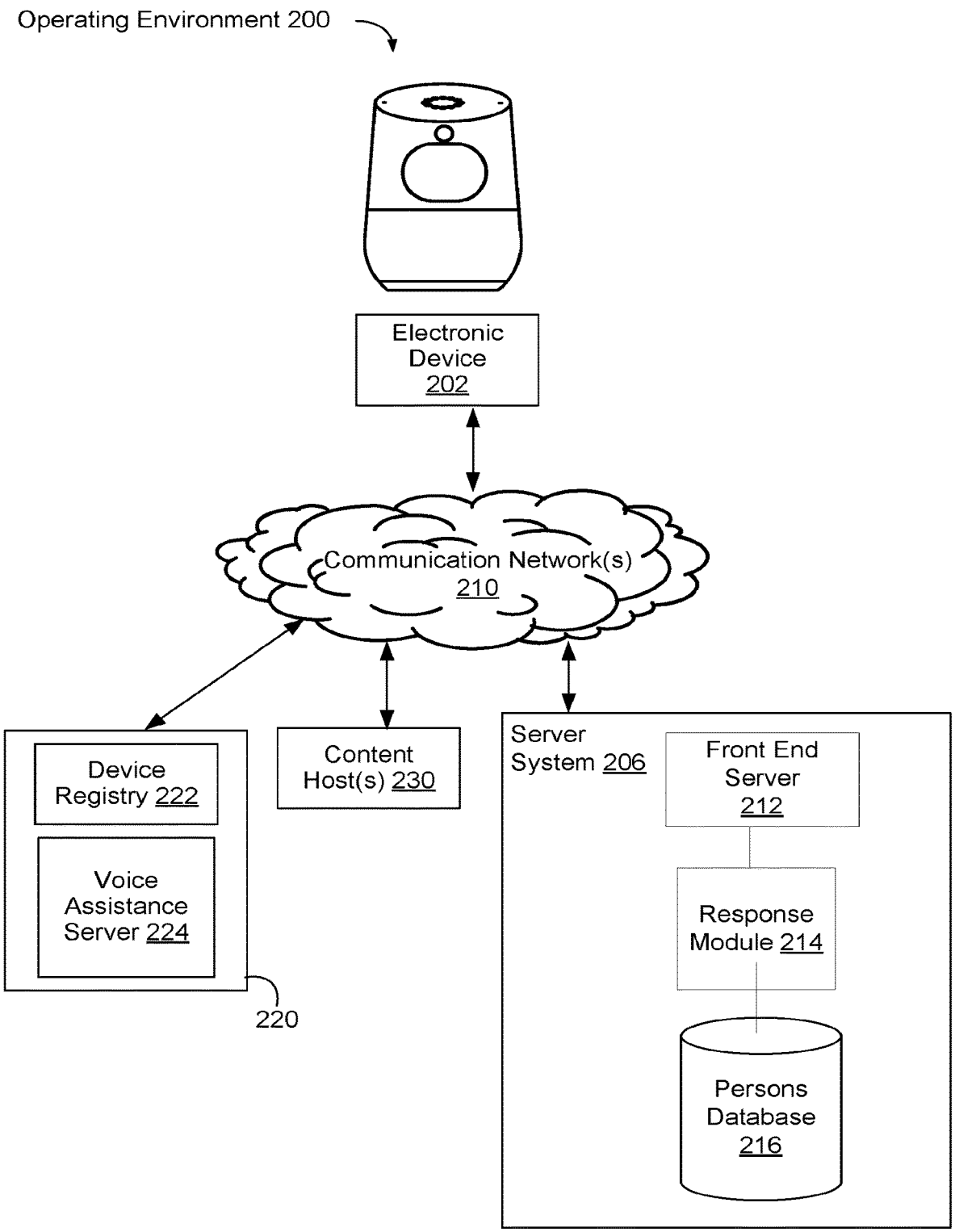
FIG. 2 is a block diagram illustrating a representative operating environment that includes an electronic device and a server system, in accordance with some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Electronic devices integrated with microphones and cameras can be used to collect audio and visual inputs from users and implement voice-activated functions according to voice inputs. Some electronic devices include a voice assistant feature that is configured to use audio inputs to perform many tasks. The functionality of these devices can be further expanded to locate and attend to user(s).

For example, Jane moves about a room while issuing multiple requests to an automated assistant device. The assistant device receives the requests and presents responses, which include visual information for Jane to view. In order to accommodate Jane's movement, the assistant device uses audio and visual cues to continually reorient on Jane as she moves about the room. This enables Jane to view the visual information without interrupting her activity. It also assures her that the assistant device is active and paying attention to her. In some instances, reorienting the assistant device also improves the quality of Jane's voice received at the device as well as the quality of device audio heard by Jane.

FIG. 1A illustrates an electronic device 100 for attending to a speaking user, in accordance with some implementations. In some implementations, the electronic device 100 includes microphones 102 (e.g., 102-1 and 102-2), an array of illuminators 104 (e.g., LEDs), one or more speakers 106, a camera 108, and a display 110. In some implementations, the electronic device 100 can rotate in a one or more directions (e.g., along an axis 112 and/or an axis 114 with the corresponding direction of rotation indicated by the respective arrows), thus enabling the electronic device 100 to direct the camera 108 and the display 110 to a speaking user. In some implementations, the camera 108 and/or the display 110 are translated and/or rotated (not shown) independently about multiple axes. In some implementations, the translation and/or rotation of the camera 108 and the display 110 are achieved without rotation of the electronic device 100. Further, the rear side of the electronic device 100 optionally includes a power supply connector configured to couple to a power supply (not shown). In some implementations, the electronic device 100 includes more or fewer microphones 102 than shown in FIG. 1A. In some implementations, the microphones 102 are arranged at locations within the electronic device 100 other than the locations shown in FIG. 1A. In some implementations, the electronic device 100 includes more than one camera 108. In some implementations, the electronic device 100 includes more than one display, or no display. In some implementations, the display 100 includes the array of illuminators 104. In some implementations, display 100 consists of one or more illuminators. In some implementations, the display 100 includes zero or more screens and one or more illuminators. In some implementations, the display 100 includes one or more components configured to present visual data.

In some implementations, the electronic device 100 is voice-activated. In some implementations, the electronic device 100 presents a clean look having no visible button, and the interaction with the electronic device 100 is based on voice and touch gestures. Alternatively, in some implementations, the electronic device 100 includes one or more physical buttons (not shown), and the interaction with the electronic device is further based on presses of the button(s) in addition to the voice and/or touch gestures.

FIG. 1B illustrates another electronic device 120 for attending to a speaking user, in accordance with some implementations. In some implementations, the electronic device 120 includes the electronic device 100 on a base 122 that includes actuators 124 that are connected by hinges 126. In some implementations, the base 122 is configured to vary the elevation (height) of the electronic device 120 (e.g., raising it to the eye level of the speaking user) so as to better attend to users. In some implementations, the actuators 124 include hydraulic, pneumatic, electrical, mechanical, telescopic, and electromechanical actuators that allow for linear motion, and/or other actuators (e.g., motors) that allow for rotational motion. In some implementations, the electronic device 120 includes more or fewer actuators 124 and/or hinges 126 than shown in FIG. 1B. Although FIG. 1B shows actuators that are external to a housing of the device 100, in some implementations, the actuators and/or motors are enclosed within a housing of the device. In some implementations, the actuators 124 are internal to the device 120. For example, the camera is optionally mounted to a track or other guide inside the housing, risers or other structures for changing height are optionally nested inside the housing, and etcetera. In some implementations, the electronic device 120 further includes a platform 128 on wheels 130 that enable the electronic device 120 to move to the proximity of the user in response to identifying the location of the user. In some implementations, the electronic device 120 includes a gripper arm (not shown) that secures the electronic device 100 while facilitating the motion of the electronic device 100.

FIG. 1C illustrates a display 140 and its range of motions, in accordance with some implementations. In some implementations, the display 140 is the display 110 as shown in FIGS. 1A and 1B. The motions of the display 140 are optionally defined using a Cartesian coordinate system or a polar coordinate system. In some implementations, the motions of the display 140 include a rotation 142 about the x-axis (e.g., roll), a rotation 144 about the y-axis (e.g., pitch), a rotation 146 about the z-axis (e.g., yaw), and/or a tilting 148. In some implementations, the display 140 can be moved in a translational manner, e.g., raised or lowered in a direction as indicated by arrow 152, and/or forward or backward in a direction as indicated by arrow 154. In some implementations, the display 140 is connected to a joint (e.g., a ball and socket joint) (not shown) and the motions of the display 140 are determined from the joint connection(s).

FIG. 2 is a block diagram illustrating an operating environment 200 that includes an electronic device 202, server systems 206, 220, and one or more content host(s) 230, in accordance with some implementations. In some implementations, the electronic device 202 includes the electronic device 100 and/or the electronic device 120. In some implementations, the electronic device 202 is located at one or more positions within a defined space, e.g., in a single room or space of a structure, or within a defined area of an open space.

In accordance with some implementations, the electronic device 202 is communicatively coupled through communication network(s) 210 to a server system 206, a smart assistant system 220, and one or more content host(s) 230. In some implementations, a content host 230 is a remote content source from which content is streamed or otherwise obtained in accordance with a user request. In some implementations, a content host 230 is an information source from which the smart assistant system 220 retrieves information in accordance with a user request.

In some implementations, the electronic device 202 is a voice-activated device and the user request is a user voice request (e.g., a voice command). The electronic device 202 responds to voice commands by: generating and providing a spoken response to a voice command (e.g., speaking the current time in response to the question, "what time is it?"); streaming media content requested by a user (e.g., "play a Beach Boys song"); reading a news story or a daily news briefing prepared for the user; playing a media item stored on the personal assistant device or on the local network; changing a state or operating one or more other connected devices (not shown) within the operating environment 200 (e.g., turning lights, appliances or media devices on/off, locking/unlocking a lock, opening windows, etc.); or issuing a corresponding request to a server via the network 210. In some implementations, the electronic device 202 displays one or more visual patterns via the array of illuminators 104 (e.g., LEDs) to convey information or to indicate visually a variety of voice processing states of the electronic device 202.

In some implementations, the server system 206 includes a front end server 212 that facilitates communication between the server system 206 and the electronic device 202 via the communication network(s) 210. For example, the front end server 212 receives audio content (e.g., the audio content is a hotword and/or speech) and/or visual content (e.g., video signals) from the electronic device 202. In some implementations, the front end server 212 is configured to send information to the electronic device 202. In some implementations, the front end server 212 is configured to send response information (e.g., addressing a user by his/her name, and/or directing attention to the user) to the electronic device 202. In some implementations, the front end server 212 is configured to send data and/or hyperlinks to the electronic device 202. For example, the front end server 212 is configured to send updates (e.g., database updates) to the electronic device 202. In some implementations, the front end server 212 is configured to receive audio and/or visual data from the electronic device 202 and send orientation information to the electronic device 202.

In some implementations, the server system 206 includes a response module 214 that determines information about a speaking user from the audio signals and/or video signals collected from the electronic device 202. In some implementations, the response module obtains identification of the speaking user from the persons database 216 (e.g., to be sent to the electronic device via the front end server 212).

In some implementations, the server system 206 includes a persons database 216 that stores information about known persons. For example, the persons database 216 includes voice signatures and/or facial features identification information about known persons.

In some implementations, the environment 200 includes multiple electronic devices 202 (e.g., devices 202-1 thru 202-N). In some implementations, the devices 202 are located throughout the environment 200 (e.g., all within a room or space in a structure, spread throughout the structure, some within the structure and some without). When a user makes an audio request, each of the devices 202 either receives the request or does not receive the input (e.g., if the device was too far away from the user). In some implementations, the electronic devices 202 receive the request at varying degrees of quality. The quality of the sample of the voice input at a device 202 is optionally based on multiple factors, including but not limited to distance of the user from the device and the noise around the device. In some implementations, the multiple devices 202 negotiate a leader amongst themselves to respond to and/or attend to the user, and to receive further voice input(s) from the user, based on the quality of the samples of the voice inputs received.

Figure 3:
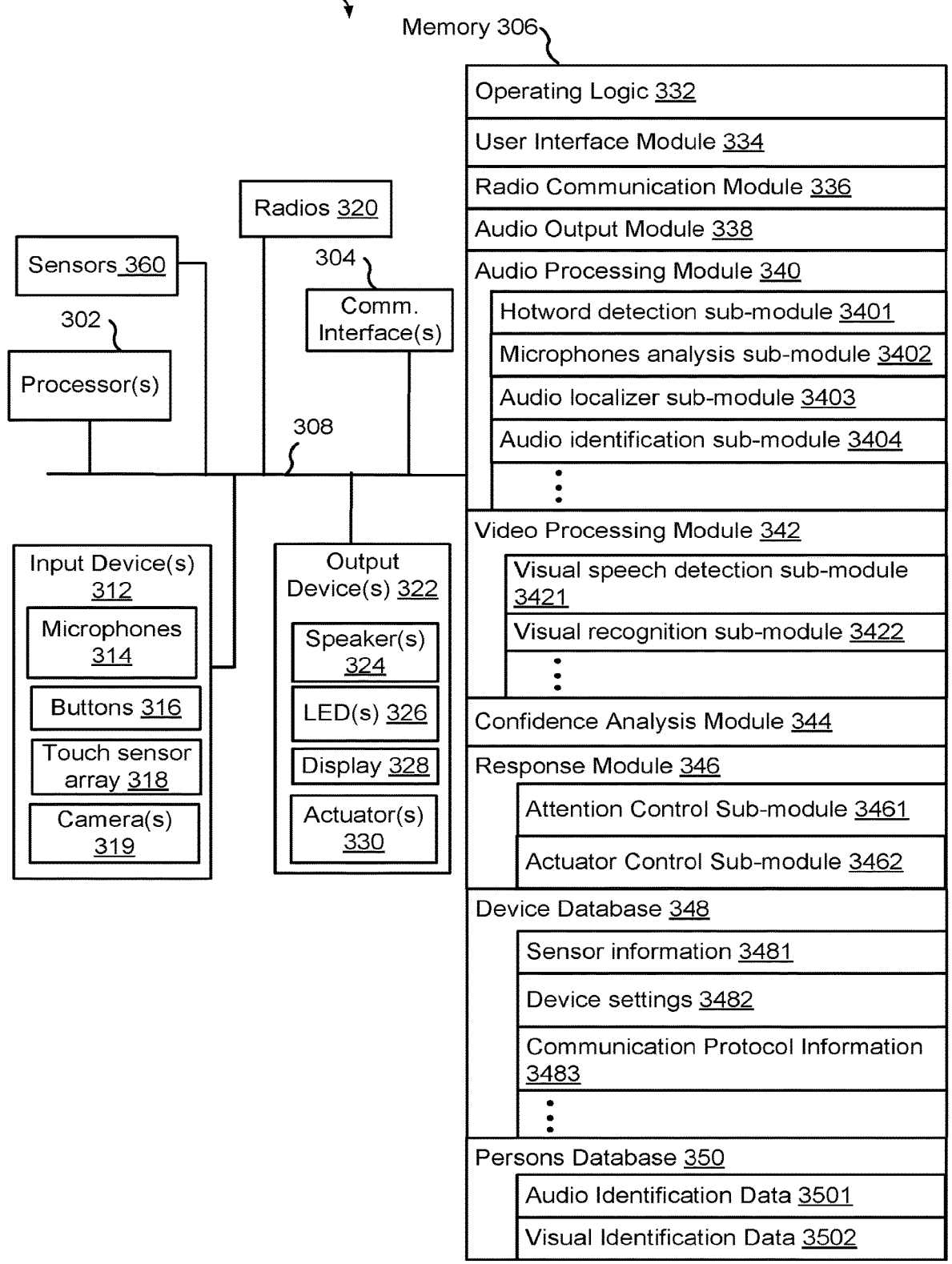
FIG. 3 is a block diagram illustrating a representative electronic device, in accordance with some implementations.

FIG. 3 is a block diagram illustrating the electronic device 202, in accordance with some implementations. In some implementations, the electronic device 202 includes one or more processor(s) 302, one or more network communication interface(s) 304, memory 306, and one or more communication buses 308 for interconnecting these components (sometimes called a chipset).

In some implementations, the electronic device 202 includes one or more input devices 312 that facilitate audio input, visual input, and/or user input, such as microphones 314, buttons 316, a touch sensor array 318, and one or more cameras 319. In some implementations, the microphones 314 include the microphones 102 and/or other microphones. In some implementations, the cameras 319 include the camera 108 and/or other cameras. In some implementations, the electronic device 202 includes one or more user affordances, such as dials, buttons, or switches.

In some implementations, the electronic device 202 includes one or more output devices 322 that facilitate audio output and/or visual output, including one or more speakers 324, LEDs 326, a display 328, and one or more actuators 330. In some implementations, the LEDs 326 include the illuminators 104 and/or other LEDs. In some implementations, the speakers 324 include the speakers 106 and/or other speakers. In some implementations, the display 328 includes the display 140 and/or other displays. In some implementations, the actuator(s) 330 include actuators that cause the electronic device 202 to change positions and/or elevations (e.g., the actuators 126 FIG. 1B), and other actuators (e.g., motors) that cause the electronic device 202 to change orientation (e.g., via rotation about the axis 112 and/or the axis 114 as shown in FIG. 1A) and/or motion in the device (e.g., via the wheels 130 in FIG. 1B). In some implementations, the actuators 330 produce one or more rotational, tilting, and/or translational motion(s) in the display 328 (e.g., the rotation 142, the rotation 144, the rotation 146, the tilting 148, translation 152, and/or the translation 154, as shown in FIG. 1C).

In some implementations, the electronic device 202 includes radios 320 and one or more sensors 330. The radios 320 enable connection to one or more communication networks, and allow the electronic device 202 to communicate with other devices. In some implementations, the radios 320 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, etc.) custom or standard wired protocols (e.g., Ethernet, HomePlug, etc.), and/or any other suitable communication protocol, including communication protocols not yet developed as of the filing date of this document.

In some implementations, the sensors 330 include one or more movement sensors (e.g., accelerometers), light sensors, positioning sensors (e.g., GPS), and/or audio sensors. In some implementations, the positioning sensors include one or more location sensors (e.g., passive infrared (PIR) sensors) and/or one or more orientation sensors (e.g., gyroscopes).

The memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 306, optionally, includes one or more storage devices remotely located from one or more processor(s) 302. The memory 306, or alternatively the non-volatile memory within the memory 306, includes a non-transitory computer-readable storage medium. In some implementations, the memory 306, or the non-transitory computer-readable storage medium of the memory 306, stores the following programs, modules, and data structures, or a subset or superset thereof:

- operating logic 332 including procedures for handling various basic system services and for performing hardware dependent tasks;
- a user interface module 334 for providing and displaying a user interface in which settings, captured data including hotwords, and/or other data can be configured and/or viewed;
- a radio communication module 336 for connecting to and communicating with other network devices coupled to one or more communication networks 210 via one or more communication interfaces 304 (wired or wireless);
- an audio output module 338 for determining and/or presenting audio signals (e.g., in conjunction with the speaker(s) 324);
- an audio processing module 340 for obtaining and/or analyzing audio signals (e.g., in conjunction with the microphones 314), including and not limited to:
  - a hotword detection sub-module 3401 for determining whether the audio signals include a hotword for waking up the electronic device 202 and recognizing such in the audio signals;
  - a microphones analysis sub-module 3402 for analyzing audio signals collected from input devices (e.g., microphones 314) and determining audio properties (e.g., audio signatures, frequencies, phase shifts and/or phase differences);
  - an audio localizer sub-module 3403 for identifying and analyzing hotword and/or audio beam(s) to determine one or more hotword and/or audio beam properties (e.g., directions, signal-to noise-ratios etc.); and
  - an audio identification sub-module 3404 for obtaining identification(s) of speaking person(s), e.g., by comparing the obtained audio signals with audio identification data 3501 stored in a persons database 350;
- a video processing module 342 for obtaining and/or analyzing video data (e.g., in conjunction with the camera(s) 319), including and not limited to:
  - a visual speech detection sub-module 3421 for determining speaking person(s) in the video data by analyzing visual signals that are produced during speech (e.g., lips opening and/or eyebrows raising); and
  - a visual recognition sub-module 3422 for determining whether the speaking person(s) is in the field of view of the camera based on the collected video data; and obtaining identification(s) of the speaking person(s), e.g., by comparing the obtained video data with visual identification data 3502 in the persons database 350;

a confidence analysis module 344 for assigning confidence score(s) to respective identified speaking person(s) based on analyzed audio signals and/or video data using the audio processing module 340 and the video processing module 342; ranking the respective identified speaking person(s) based on confidence score(s); and/or determining the speaking person based on the highest assigned confidence score; and a response module 346 for directing attention to speaking user(s), including and not limited to:
an attention control sub-module 3461 for identifying the speaking person based on the highest assigned confidence score; and directing attention to identified speaking person (e.g., acknowledging the speaking person by his/her name); and
an actuator control sub-module 3462 for controlling the actuators 330 to direct the electronic device 202 toward the identified speaking person (e.g., rotating the electronic device 202, rotating the display 328, tilting the display 328, and/or translating the display 328 toward the speaking person); and a device database 348 for storing information associated with the electronic device 202, including, and not limited to:
sensor information 3481 from the sensors 330;
device settings 3482 for the electronic device 202, such as default options and preferred user settings; and
communications protocol information 3503 specifying communication protocols to be used by the electronic device 202;

a persons database 350 for storing persons information, which includes, in accordance with some implementations, the following datasets or a subset or superset thereof:
audio identification data 3501 including audio information (e.g., audio signatures, audio fingerprints etc.) corresponding to particular persons; and
visual identification data 3502 including visual information (e.g., facial features, hair color, eye color etc.) corresponding to particular persons.

Each of the above identified modules are optionally stored in one or more of the memory devices described herein, and corresponds to a set of instructions for performing the functions described above. The above identified modules or programs need not be implemented as separate software programs, procedures, modules or data structures, and thus various subsets of these modules may be combined or otherwise re-arranged in various implementations. In some implementations, the memory 306 stores a subset of the modules and data structures identified above. Furthermore, the memory 306, optionally, stores additional modules and data structures not described above (e.g., module(s) for storing a layout of the room in which the electronic device 202 is located). In some implementations, a subset of the programs, modules, and/or data stored in the memory 306 are stored on and/or executed by the server system 206 and/or the voice assistance server 224.

Figure 4:
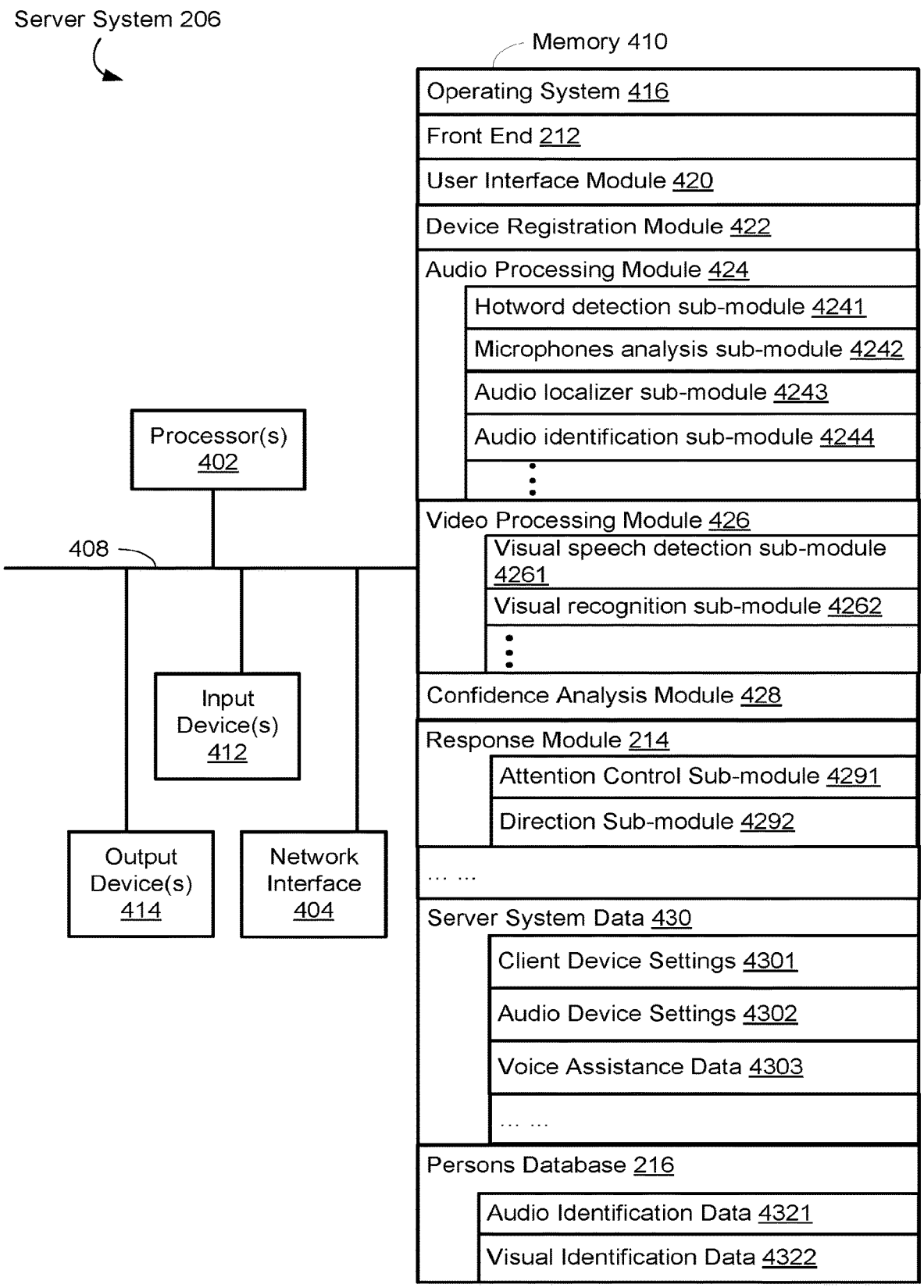
FIG. 4 is a block diagram illustrating a representative server system, in accordance with some implementations.

FIG. 4 is a block diagram illustrating the server system 206, in accordance with some implementations. The server system 206 includes one or more processor(s) 402, one or more network interfaces 404, memory 410, and one or more communication buses 408 for interconnecting these components (sometimes called a chipset), in accordance with some implementations.

The server system 206 optionally includes one or more input devices 412 that facilitate user input, such as a keyboard, a mouse, a voice-command input unit or microphone, a touch screen display, a touch-sensitive input pad, a gesture capturing camera, or other input buttons or controls. In some implementations, the server system 206 optionally uses a microphone and voice recognition or a camera and gesture recognition to supplement or replace the keyboard. The server system 206 optionally includes one or more output devices 414 that enable presentation of user interfaces and display content, such as one or more speakers and/or one or more visual displays.

The memory 410 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 410, optionally, includes one or more storage devices remotely located from the one or more processors 402. The memory 410, or alternatively the non-volatile memory within the memory 410, includes a non-transitory computer-readable storage medium. In some implementations, the memory 410, or the non-transitory computer-readable storage medium of the memory 410, stores the following programs, modules, and data structures, or a subset or superset thereof:
an operating system 416 including procedures for handling various basic system services and for performing hardware dependent tasks;
a front end 212 for communicatively coupling the server system 206 to other devices (e.g., the electronic device 202) and one or more networks, such as the Internet, other wide area networks, local area networks, metropolitan area networks, and so on;
a user interface module 420 for enabling presentation of information (e.g., a graphical user interface for presenting application(s), widgets, websites and web pages thereof, games, audio and/or video content, text, etc.) either at the server system or at a remote electronic device;
a device registration module 422 for registering devices (e.g., the electronic device 202) for use with the server system 206;
an audio processing module 424 for obtaining and/or analyzing audio signals, including and not limited to:
a hotword detection sub-module 4241 for determining whether the audio signals include a hotword for waking up electronic device(s) (e.g., electronic device 202) and recognizing such in the audio signals;
a microphones analysis sub-module 4242 for analyzing audio signals collected from one or more electronic devices (e.g., electronic device 202) and determining audio properties (e.g., audio signatures, frequencies, phase shifts and/or phase differences);
an audio localizer sub-module 4243 for analyzing audio beams based on audio heard when the user hotwords the device (e.g., electronic device 202), and for determining audio beam properties (e.g., directions, signal-to noise-ratios etc.); and
an audio identification sub-module 4244 for obtaining identification(s) of speaking person(s), e.g., by comparing the audio signals obtained from electronic device(s) (e.g., electronic device 202) with audio identification data 3501 in a persons database 216;

an video processing module 426 for obtaining and/or analyzing video data collected, including and not limited to:

a visual speech detection sub-module 4261 for determining speaking person(s) from video data of electronic device(s) (e.g., electronic device 202), e.g., by analyzing visual signals that are produced during speech (e.g., lips opening and/or eyebrows raising); and a visual recognition sub-module 4262 for determining whether the speaking person(s) is in the field of view of the camera of the electronic device(s) (e.g., camera(s) 319 of the electronic device 202) based on the collected video data; and/or for obtaining identification of the speaking person(s), e.g., by comparing the obtained video data with visual identification data 2162 in the persons database 216;

a confidence analysis sub-module 428 for assigning confidence score(s) to respective identified speaking person(s) obtained from the audio processing module 424 and the video processing module 426; ranking the respective identified speaking person(s) based on confidence score(s); and/or determining the speaking person based on the highest assigned confidence score;

a response module 214 for directing attention to speaking user(s), including and not limited to:

an attention control sub-module 4291 for identifying the speaking person based on the highest assigned confidence score; and directing the electronic device (e.g., electronic device 202) to attend to the identified speaking person (e.g., acknowledging the speaking person by his/her name); and an actuator control sub-module 4292 for determining the coordinates (e.g., Cartesian coordinates and/or polar coordinates) corresponding to the location of the speaking person; and directing the actuator(s) of the electronic device(s) (e.g., the actuators 330 of the electronic device 202) to the location of the speaking person; and server system data 430 storing data associated with the server system 206, including, but not limited to:

client device settings 4301 including device settings for one or more electronic devices (e.g., electronic device(s) 202), such as common device settings (e.g., service tier, device model, storage capacity, processing capabilities, communication capabilities, etc.), and information for automatic media display control;

audio device settings 4302 including audio settings for audio devices associated with the server system 206 (e.g., electronic device(s) 202), such as common and default settings (e.g., volume settings for speakers and/or microphones etc.); and voice assistance data 4303 for voice-activated devices and/or user accounts of the voice assistance server 224, such as account access information and information for one or more electronic devices 202 (e.g., service tier, device model, storage capacity, processing capabilities, communication capabilities, etc.); and a persons database 216 for storing persons information, which includes, in accordance with some implementations, the following datasets or a subset or superset thereof:

audio identification data 4321 including audio information (e.g., audio signatures, audio fingerprints etc.) corresponding to particular persons; and visual identification data 4322 including visual information corresponding to particular persons.

In some implementations, the server system 206 includes a notification module (not shown) for generating alerts and/or notifications for users of the electronic device(s). For example, in some implementations the persons database 216 is stored locally on the electronic device of the user, the server system 206 may generate notifications to alert the user to download the latest version(s) or update(s) to the persons database.

Each of the above identified elements may be stored in one or more of the memory devices described herein, and corresponds to a set of instructions for performing the functions described above. The above identified modules or programs need not be implemented as separate software programs, procedures, modules or data structures, and thus various subsets of these modules may be combined or otherwise re-arranged in various implementations. In some implementations, the memory 410, optionally, stores a subset of the modules and data structures identified above. Furthermore, the memory 410 optionally stores additional modules and data structures not described above.

Figure 5B:
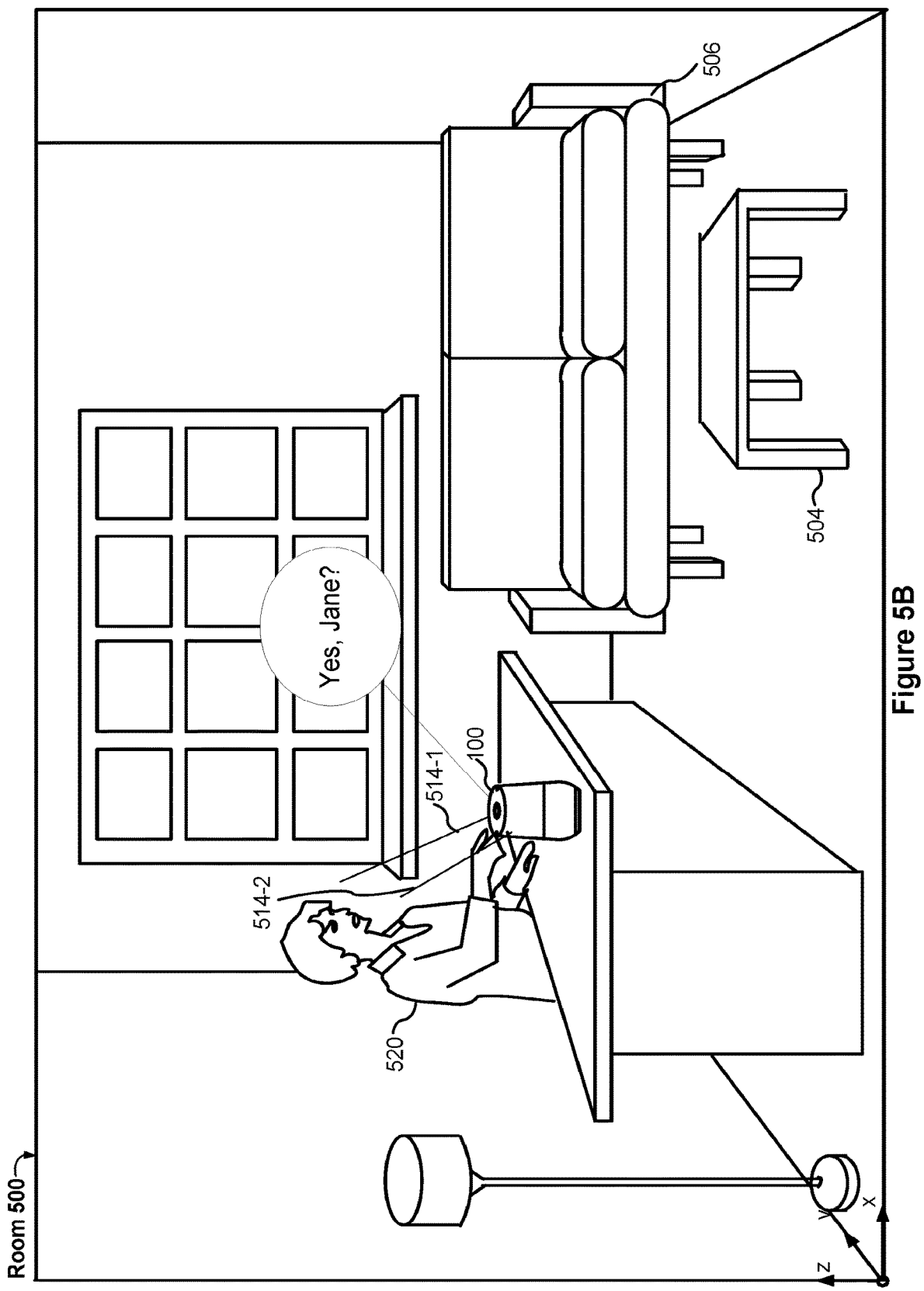

FIGS. 5A-5B illustrate a representative operation of the electronic device 202 of FIG. 3, in accordance with some implementations. In this example, the electronic device 202 is the electronic device 100 as shown in FIG. 1A. FIG. 5A shows a room 500 that includes a countertop 502, a table 504, and a sofa 506. As shown in FIG. 5A, the electronic device 100 is initially on the countertop 502 with the camera 108 and the display 110 of the electronic device 100 directed toward a wall 508 located on the right (+x direction) of the room 500. The field of view of the camera 108 is illustrated by lines 512. A user 520 addresses the electronic device 100 by speaking a hotword ("OK Assistant."). In some implementations, the electronic device 100 is in a standby mode and the detection of the hotword (also sometimes called a "wake word") awakens the electronic device 100 (e.g., via the hotword detection sub-module 3401).

FIG. 5B illustrates the electronic device 100 responding to the detection of the spoken hotword by the user 520, in accordance with some implementations. As shown in FIG. 5B the electronic device 100 reorients so that the user 520 is within the field of view of the device and responds by addressing the user 520 by name ("Yes, Jane?"). In some implementations, in response to the detected hotword, the electronic device 100 determines based on the obtained hotword signals that the person 520 is speaking in a vicinity of the electronic device (e.g., by identifying of one or more hotword beam(s) and their corresponding determining signal-to-noise ratios using the audio localizer sub-module 3402). In some implementations, the electronic device 100 obtains identification of the speaking person by comparing the obtained audio signals with audio identification data (e.g., using the audio identification sub-module 3404).

In some implementations, in response to the detected hotword, the electronic device 100 further determines that the speaking person 520 is not in the field of view of the camera 108 (e.g., using the visual speech detection sub-module 3421 and/or the visual recognition sub-module 3422). In some implementations, the electronic device 100 reorients itself based on differences in the audio data received at the respective microphones 102. In some implementations, orienting the electronic device 100 includes rotating the electronic device 100 (e.g., about the axis 112 and/or the axis 114). In some implementations, after reorienting, the electronic device 100 obtains video data from the camera 108 and determines from the video data that the speaking person is now in the field of view. In some implementations, the electronic device 100 directs attention to the identified speaking user including acknowledging the speaking person by his/her name ("Yes Jane?") (e.g., using the attention control sub-module 3461). In some implementations, directing attention to the identified speaking user includes re-positioning one or more physical features on the electronic device 100 (e.g., re-positioning the array of illuminators 104). In some implementations, directing attention to the identified speaking user includes re-directing presentation of visual data (e.g., re-directing illumination from the array of illuminators 104). In some implementations, directing attention to the identified speaking user includes adjusting a directionality of a presentation of visual data toward the identified user (e.g., adjusting illumination from the array of illuminators 104 to indicate a direction of the identified user).

Figure 6A:
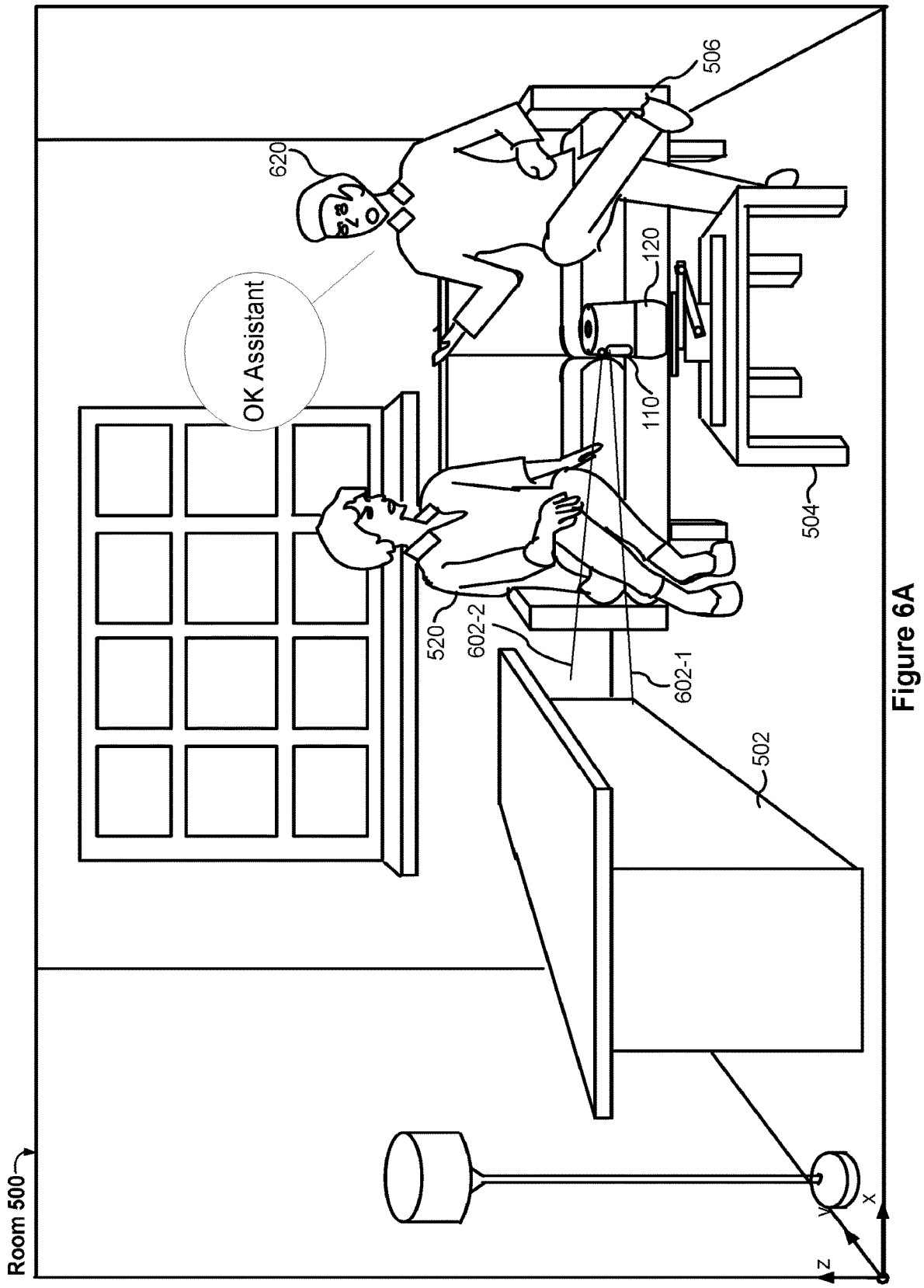
FIGS. 6A-6B illustrate another representative operation of the electronic device of FIG. 3, in accordance with some implementations.
Figure 6B:
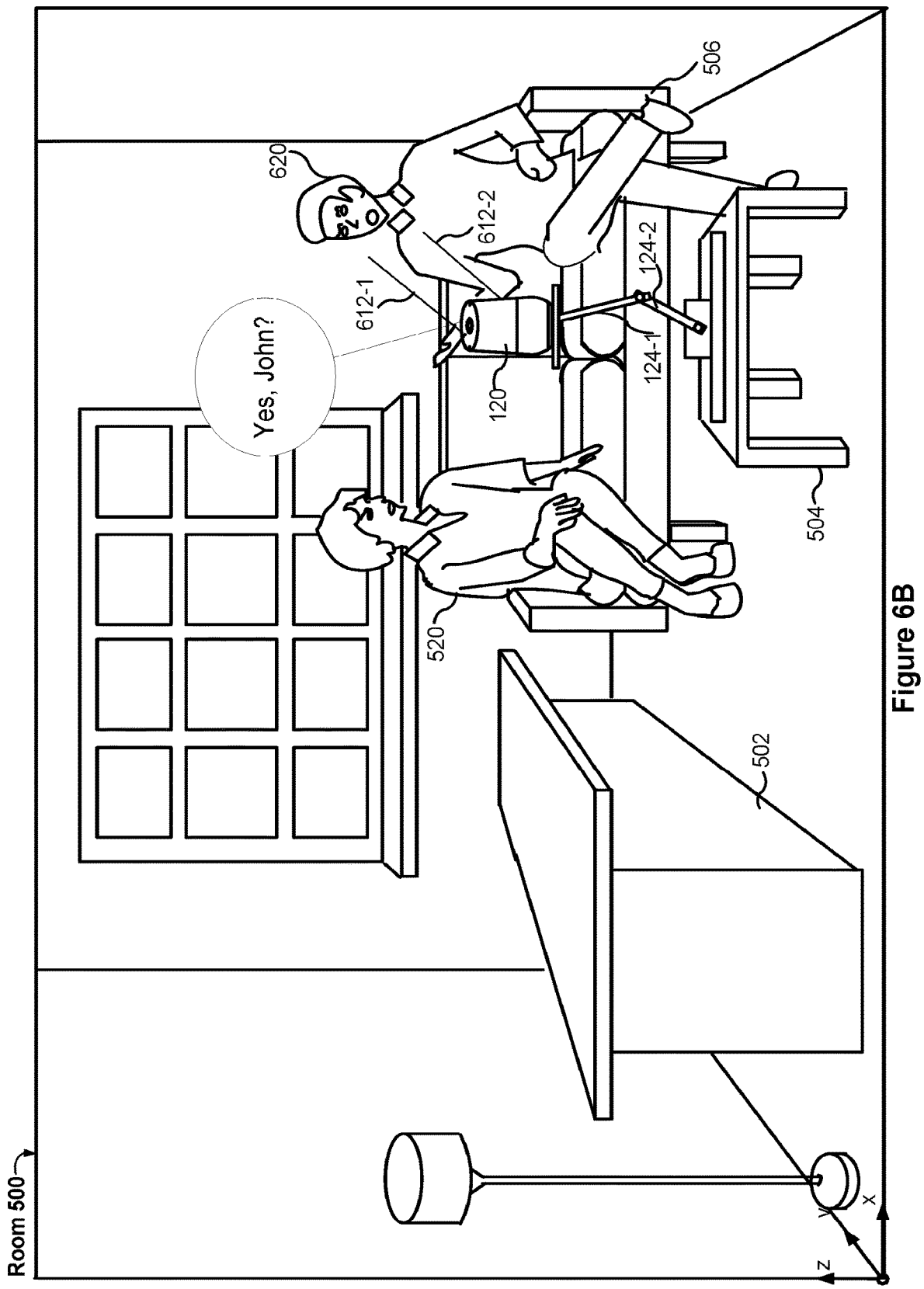

FIGS. 6A-6B illustrate another representative operation of the electronic device 202 of FIG. 3, in accordance with some implementations. In this example, the electronic device 202 is the electronic device 120 as shown in FIG. 1B. FIG. 6A shows the room 500 with the electronic device 120 positioned on the table 504. As shown in FIG. 6A, the camera 108 and the display 110 of the electronic device 120 are initially directed toward the countertop 502. The field of view of the camera 108 is illustrated by lines 602. As shown in FIG. 6A, there are two users in the room 500, namely: the user 520 and another user 620, both of whom are sitting on the sofa 506. The user 620 addresses the electronic device 120 by speaking a hotword ("OK Assistant."). In some implementations, the electronic device 120 is in a standby mode and the detection of the hotword (e.g., via the hotword detection sub-module 3401) awakens the electronic device 120.

FIG. 6B illustrates the response of the electronic device 120 as a result of detecting the spoken hotword by the user 620, in accordance with some implementations. As shown in FIG. 6B the electronic device 120 reorients so that the user 620 is within the field of view of the device and responds by addressing the user 620 by name ("Yes, John?"). In some implementations, in response to the detected hotword, the electronic device 120 identifies one or more hotword beam(s) and determines the audio beam direction which has the highest-signal-to-noise ratio of the hotword power (e.g., using the audio localizer sub-module 3402). In some implementations, the electronic device 120 obtains identification of the speaking user by comparing the obtained audio signals with audio identification data (e.g., using the audio identification sub-module 3404). In some implementations, in response to the detected hotword, the electronic device 120 determines that the speaking user is not in the field of view of the camera 108 (e.g., using the visual speech detection sub-module 3421 and/or the visual recognition sub-module 3422).

In some implementations, the electronic device 120 reorients itself based on differences in the audio data received at the respective microphones 102. In some implementations, orienting the electronic device 120 includes rotating the electronic device 100 (e.g., about the axis 112 and/or the axis 114). In some implementations, reorienting the electronic device 120 includes controlling the actuators 124 to change the position (e.g., increasing the height) of the electronic device 120. In some implementations, reorienting the electronic device 120 includes moving the electronic device to the proximity of the user (e.g., using the wheels 130 of FIG. 1B, not shown).

In some implementations, after reorienting itself, the electronic device 120 obtains additional video data using the camera 108, and determines that multiple users (e.g., user 520 and user 620) are within the field of view of the electronic device 120. In some implementations, in accordance with the determination that multiple users are in the field of view, the electronic device 120 assigns a confidence score (e.g., using the confidence analysis module 344) to each of the users 520 and 620. In some implementations, the assignment of the confidence score is based on the analysis of the audio and/or video signals. In this example, the electronic device 120 assigns a higher confidence score to the user 620 based on a determination (e.g., using the speech detection submodule 3421) that the eyebrows of the user 620 are raised and the mouth of the user 520 is open. Accordingly, the electronic device 120 determines identifies that the user 620 is the speaking user.

In some implementations, in accordance with the determination that the user 620 is the speaking user, the electronic device attends to the speaking user by directing the display 110 toward the user 620, as illustrated by lines 612 which indicate the field of view of the display 110. In some implementations, directing attention to the speaking user includes acknowledging the speaking user 620 by his name ("Yes John?") (e.g., using the attention control sub-module 34610.

Figure 7A:
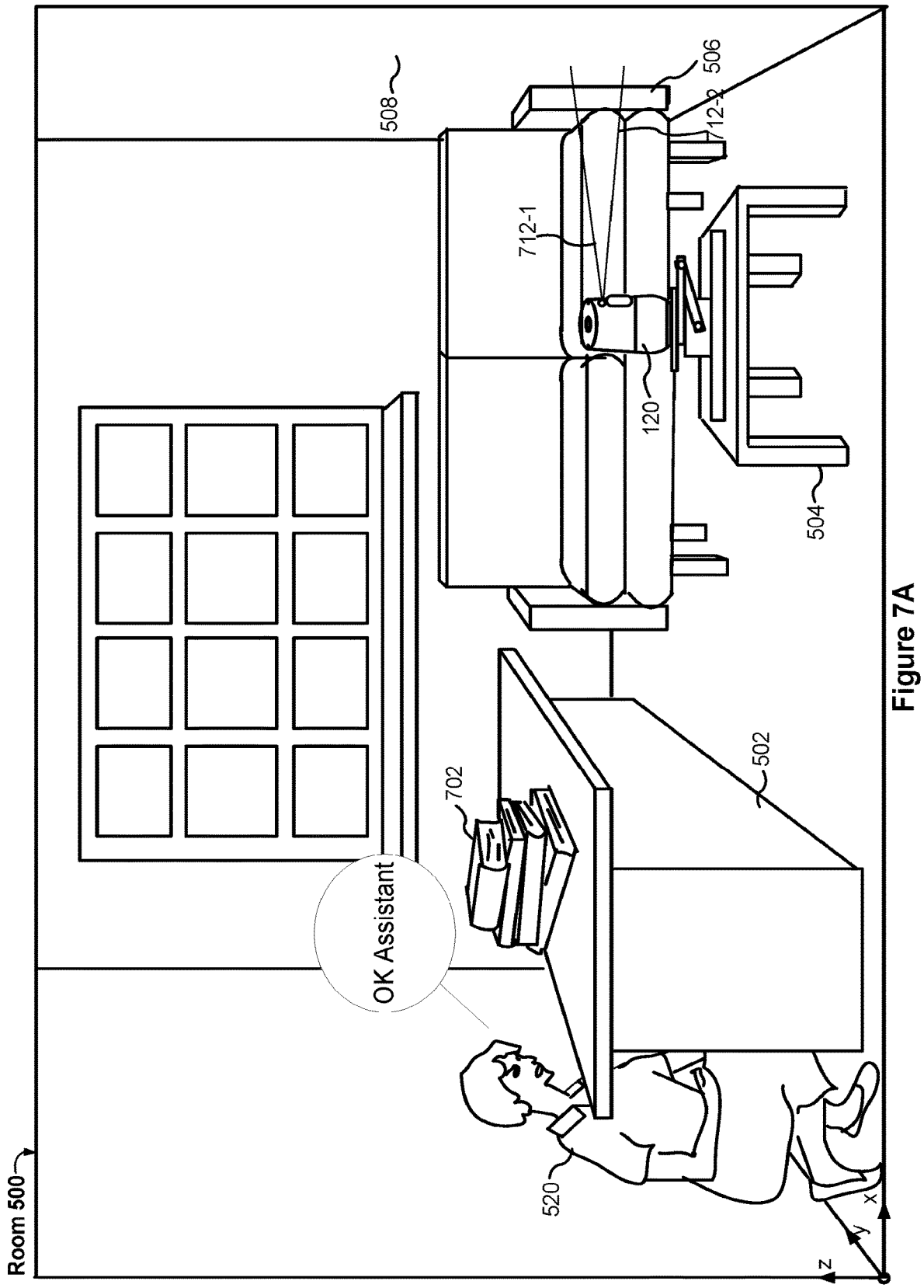
FIGS. 7A-7B illustrate another representative operation of the electronic device of FIG. 3, in accordance with some implementations.
Figure 7B:
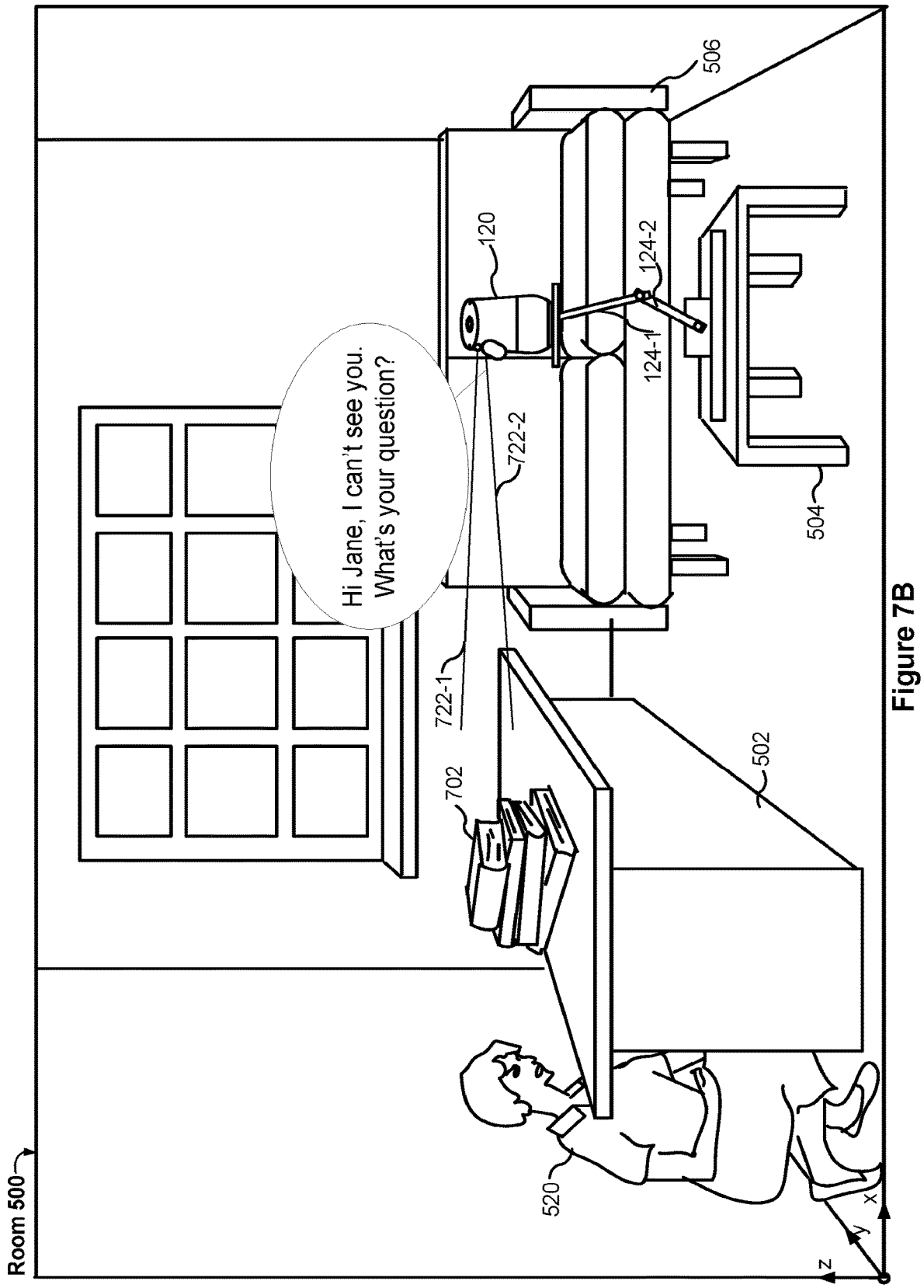

FIGS. 7A-7B illustrate another representative operation of the electronic device 202 of FIG. 3, in accordance with some implementations. In this example, the electronic device 202 is the electronic device 120 as shown in FIG. 1B. FIG. 7A shows the room 500 with the electronic device 120 on the table 504. As shown in FIG. 7A, the camera 108 and the display 110 of the electronic device 120 are initially directed towards the right wall 508. The field of view of the camera 108 is illustrated by lines 712. As shown in FIG. 7A, the countertop 502 includes a stack of books 702, and the user 520 is located behind the countertop 502. The user 520 addresses the electronic device 120 by speaking a hotword ("OK Assistant."). In some implementations, the electronic device 120 is in a standby mode and the detection of the hotword (e.g., via the hotword detection sub-module 3401) awakens the electronic device 120.

FIG. 7B illustrates the response of the electronic device 120 as a result of detecting the spoken hotword by the user 520, in accordance with some implementations. As shown in FIG. 7B the electronic device 120 reorients in an attempt to have the user 520 within the field of view of the device, but its field of view is blocked by the books 702. Accordingly, the electronic device 120 responds by notifying the user 520 that the device is attending to the user 520 even though the device 120 does not have line-of-sight with the user. In some implementations, the electronic device 120 identifies one or more hotword beam(s) and determines the audio beam direction which has the highest-signal-to-noise ratio of the hotword power (e.g., using the audio localizer sub-module 3402). In some implementations, the electronic device 120 obtains identification of the speaking user by comparing the obtained audio signals with audio identification data (e.g., using the audio identification sub-module 3404).

In some implementations, in response to the detected hotword, the electronic device 120 further determines that the speaking user 520 is not in the field of view of the camera 108 (e.g., using the visual speech detection sub-module 3421 and/or the visual recognition sub-module 3422). In some implementations, the electronic device 120 reorients itself based on differences in the audio data received at the respective microphones 102. In this example, the electronic device 120 reorients by rotating itself (e.g., about the axis 112 and/or the axis 114) and by changing its position using the actuators 124 (e.g., using the actuator control sub-module 3462).

In some implementations, after reorienting, the electronic device 120 obtains additional video data from the camera 108 and determines from the additional video data that the speaking person is not in the field of view. In this example, even though the camera 108 and the display 110 have been reoriented to face the user 520, the stack of books 702 obstructs the user 520 from the field of view of the camera 108. In some implementations, in accordance with a determination that the speaking user is not visible, the electronic device 120 indicates via the display 110 that the speaking user is not visible (e.g., using the attention control sub-module 3461). In some implementations, in accordance with a determination that the speaking user 520 is not visible, the electronic device 120 acknowledges the speaking user 520 verbally and at the same time, presents a verbal indication (e.g., using the attention control sub-module 3461) that the speaking user 520 is not visible to the electronic device 120 ("Hi Jane, I can't see you. What's your question?").

Figure 8A:
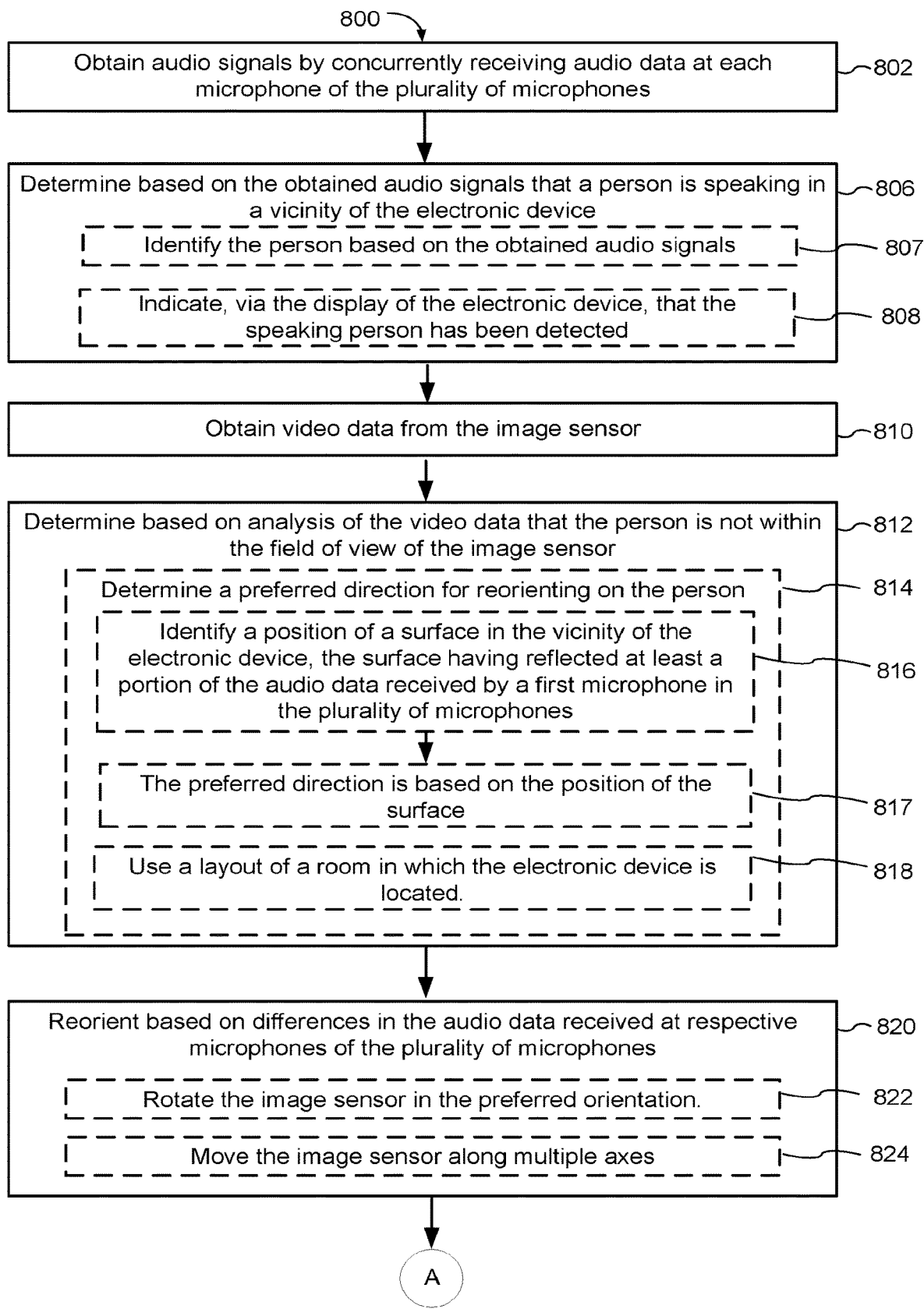
FIGS. 8A-8C are flowchart representations of a method for attending to a presenting user, in accordance with some implementations.
Figure 8B:
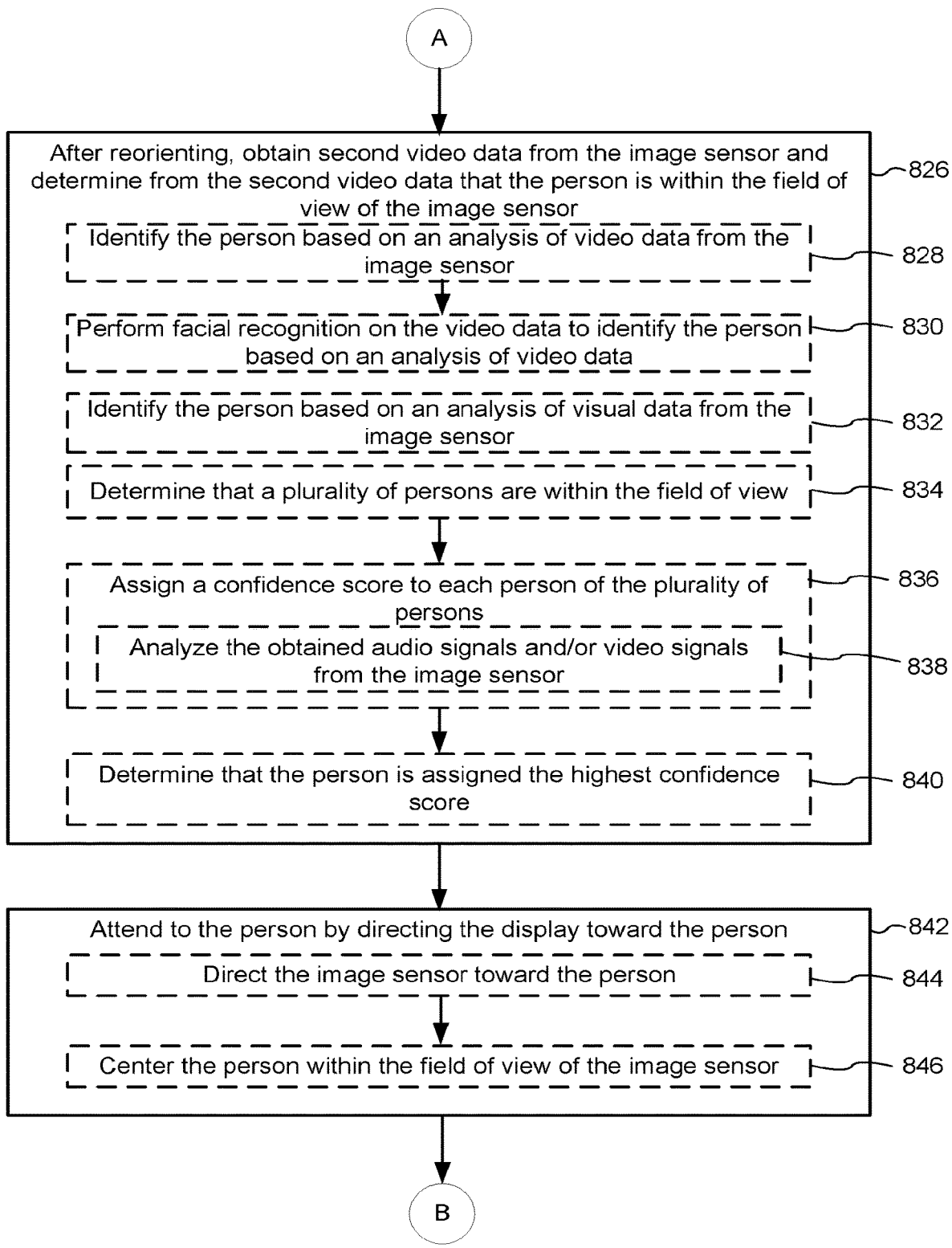
Figure 8C:
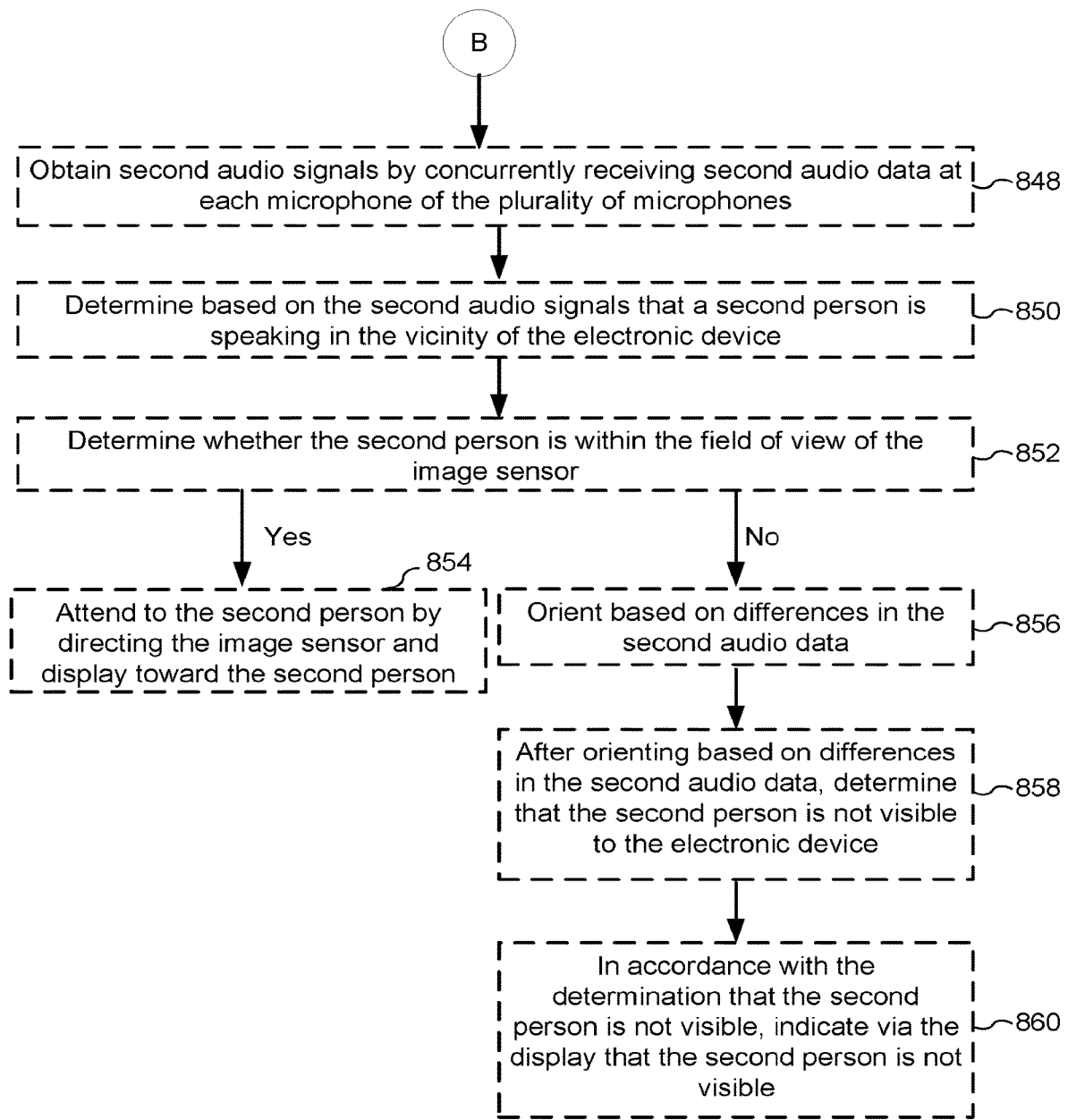

FIGS. 8A-8C are flowchart representations of a method 800 for attending to a presenting user utilizing the electronic device 202 of FIG. 3, in accordance with some implementations. In some implementations, the method 800 is performed by: (1) one or more electronic devices 202; (2) one or more server systems, such as server system 206; or (3) a combination thereof. In some implementations, the method 800 is governed by instructions that are stored in a non-transitory computer readable storage medium and that are executed by one or more processors of a device/computing system, such as the one or more processors 302 of the electronic device 202 and/or the one or more processors 402 of the server system 206. For convenience, specific operations detailed below are described as being performed by the electronic device 202.

The electronic device 202 obtains (802) audio signals by concurrently receiving audio data at each microphone of a plurality of microphones (e.g., microphones 314). In some implementations, the received audio data includes hotwords. For example, FIG. 5A shows the user 520 addressing the electronic device 100 by speaking a hotword. In some implementations, the electronic device 202 is in a standby mode and the hotword(s) for awaken the electronic device 202 (e.g., using the hotword detection sub-module 3401). In some implementations, the received audio data includes a user query and the electronic device 202 gathers data from one or more remote sources (e.g., content host(s) 230) to answer the user query.

The electronic device 202 determines (806) based on the obtained audio signals that a person is speaking in the vicinity of the electronic device 202. For example, the device 202 identifies one or more words within the obtained audio signal. As another example, the device 202 determines that the audio includes a person speaking based on an analysis of the frequency, pitch, or cadence of the obtained audio. In some implementations, the electronic device 202 identifies (807) the speaking person based on the obtained audio signals. In some implementations, the electronic device 202 identifies the person by comparing the obtained audio signals with audio identification data (e.g., the audio identification data 3501 in the persons database 350).

In some implementations, upon detecting an unknown voice, the electronic device 202 queries the user for an identification and stores the identification and the voice in the persons database 350. In some implementations, the electronic device 202 generates an audio query to the user. In some implementations, the electronic device generates an electronic notification (e.g., to be sent to the user's mobile device).

In some implementations, after determining that the person is speaking in the vicinity of the electronic device 202, the electronic device 202 indicates (808) via the display (e.g., the display 328) that a speaking person has been detected. In some implementations, indicating via the display that a speaking person has been detected includes turning on/off an illuminator (e.g., the LEDs 326), adjusting a color of a display (e.g., the display 328), or the like. In some implementations, after determining that the person is speaking, the electronic device 202 further determines that the person has spoken a hotword (e.g., using the hotword detection sub-module 3401) and indicates via the display 328 that the hotword has been detected. In some implementations, after the electronic device 202 determines that the person is speaking, the electronic device 202 determines that the person is speaking to the electronic device 202, and indicates via the display that the electronic device is aware of the person speaking. In some implementations, after determining that the person is speaking, the electronic device 202 further determines that the person has issued a query and the device indicates that the query has been received (e.g., via a visual and/or audio presentation).

The electronic device 202 obtains (810) video data from one or more image sensor(s) (e.g., the camera(s) 319). In some implementations, video data is obtained on a continuous basis. In some implementations, video data is obtained continuously over a predetermined time period (e.g., 2 seconds, 30 seconds, etc.). In some implementations, video data is obtained intermittently over a predetermined time period (e.g., one frame every five seconds over a duration of ten minutes).

The electronic device 202 determines (812) based on analysis of the video data that the person is not within the field of view of the image sensor. In some implementations, the determination is made using the video processing module 342, including the visual speech detection sub-module 3421 and/or the visual recognition sub-module 3422. In some implementations, the determination is made by comparing the video data with visual identification data 3502 in the persons database 350.

In some implementations, upon detecting an unknown person, the electronic device 202 queries the user for an identification and stores the identification and feature data of the person in the persons database 350. In some implementations, the electronic device 202 generates an audio query to the user. In some implementations, the electronic device generates an electronic notification (e.g., to be sent to the user's mobile device). In some implementations, the identification and feature data correspond to a particular voice and the feature data is associated with the voice.

In some implementations, in accordance with the determination that the person is not within the field of view of the image sensor, the electronic device 202 determines (814) a preferred direction for reorienting on the person. In some implementations, determining the preferred direction is based on the hotword and/or audio beam(s) of the obtained audio signals that are created by the electronic device 202 (e.g., using the audio localizer sub-module 3403). In some implementations, determining the preferred direction is based on one or more hotword and/or audio beam properties (e.g., directions, signal-to noise-ratios, etc.) of the obtained audio signals.

In some implementations, determining a preferred direction for reorienting on the person includes identifying (816) a position of a surface in the vicinity of the electronic device 202, the surface having reflected at least a portion of the audio data received by a first microphone of the plurality of microphones 314. In some implementations, the preferred direction for reorienting (817) on the person is based on the position of the surface. For example, the device 202 determines that a wall is directly behind the device and that part of the audio data received was a reflection of audio from the wall. In this example, the device 202 accounts for the audio reflection and determines that the preferred direction is not the direction of the wall.

In some implementations, the preferred direction for reorienting (818) on the person is based on a layout of the room in which the electronic device 202 is located. In some implementations, the electronic device 202 stores a mapping of the room, dwelling, or structure. For example, as noted in the description of FIG. 3, the memory 306 of the electronic device 202 optionally stores a layout of the room in which the electronic device 202 is located. To further illustrate, the electronic device 202 determines based on the room layout and an analysis of the hotword beam(s) that it is situated next to a wall, and therefore receives audio beams that originate from both a user as well as from reflection off a vicinity wall. In this example, the electronic device 202 determines the preferred direction for reorienting on the person to be the direction away from the wall.

In some implementations, the mapping of the room is obtained via radar, sonar, etc. (e.g., obtained via sensor 360 of the electronic device 202). In some implementations, the layout of the room is obtained via an analysis of video data from the image sensor (e.g., the camera(s) 319).

The electronic device 202 reorients (820) the electronic device 202 based on differences in the audio data received at respective microphones in the plurality of microphones 314. In some implementations, reorienting the electronic device 202 includes rotating the electronic device 202 about its axis (e.g., about the axis 112 and/or the axis 114 as shown in FIG. 1A). In some implementations, reorienting the electronic device 202 includes translating, elevating, and/or rotating the electronic device (e.g., using the actuators 330).

In some implementations, reorienting the electronic device 202 includes rotating (822) the image sensor (e.g., camera(s) 319) in the preferred orientation (as determined in 814). In some implementations, reorienting the electronic device includes rotating the display (e.g., the display 319) and the image sensor (e.g., camera(s) 319). In some implementations, reorienting the electronic device 202 includes moving (824) the image sensor (e.g., camera(s) 319) along multiple axes. In some implementations, moving the image sensor along multiple axes includes, e.g., adjusting pitch and yaw; tilting the display up/down to align with a person's line of sight; moving toward the person; adjusting elevation; etc. In some implementations, reorienting the electronic device 202 comprises moving the display and image sensor; or the entire device.

After reorienting, the electronic device 202 obtains (826) second video data from the image sensor (e.g., camera(s) 319) and determines from the second video data that the person is within the field of view of the image sensor (e.g., using the video processing module 342).

In some implementations, the electronic device 202 identifies (828) the person based on an analysis of the video data from the image sensor. In some implementations, the electronic device 202 performs (830) facial recognition on the video data to identify the person based on the analysis of the video data (e.g., by comparing the obtained video data with visual identification data 3502 in the persons database 350). In some implementations, identifying the person includes identifying the person based on the person's dimensions, respiratory patterns, and/or gait. In some implementations, performing facial recognition includes a determination of the distance between the image sensor and the person.

In some implementations, the electronic device 202 identifies (832) the person based on an analysis of visual data from the image sensor. In some implementations, the identification of the person is based on visual speech detection technique (e.g., using the visual speech detection sub-module 3421). In some implementations, the visual speech detection technique includes determining that the person's mouth/face (e.g., eyebrow) is moving. In some implementations, the visual speech detection technique includes determining that the person's mouth movements correlate with the received audio signals.

In some implementations, after the electronic device 202 reorients itself and obtains second video data from the image sensor, the electronic device 202 determines (834) that a plurality of persons is within the field of view of the image sensor. For example, FIG. 6B illustrates two users, namely the user 520 and the user 620, in the field of view of the camera 108 electronic device 202. In accordance with the determination that a plurality of persons is within the field of view of the image sensor, the electronic device 202 assigns (836) a confidence score to each person of the plurality of persons (e.g., using the confidence analysis module 344). In some implementations, the confidence score is based on analyzing (838) the audio signals and/or video signals from the image sensor (e.g., using one or more of: the audio localizer sub-module 3403, the audio identification sub-module 3404, the visual speech detection sub-module 3421, and the visual recognition sub-module 3422). In some implementations, different weights are assigned to the respective components of the audio signals and/or visual signals. In some implementations, determining that the person is within the field of view of the image sensor includes determining that the person is assigned (840) the highest confidence score.

The electronic device 202 attends (842) to the person by directing the display (e.g., the display 328) to the person. In some implementations, the display includes a screen (e.g., a touch screen), one or more illuminators 104 (e.g., LEDs), and/or a user interface with one or more affordances. In some implementations, directing the display includes moving (e.g., translating and/or rotating) the display to the speaking user. For example, FIG. 6B shows the electronic device 120 moving from an initial position (shown in FIG. 6A) to an attentive position showing attention to the speaking user 620, as illustrated by the lines 612.

In some implementations, the electronic device 202 attends to the person by directing (844) the image sensor (e.g., camera(s) 319) toward the person. In some implementations, directing the image sensor toward the person includes centering (846) the person within the field of view of the image sensor. In some implementations, directing the image sensor toward the person includes focusing the image sensor on the person. In some implementations, directing the image sensor toward the person includes adjusting a brightness and/or contrast to highlight the person. In some implementations, additional to directing the image sensor toward the person, the electronic device 202 also outputs a visual indication (e.g., a predefined pattern using the one or more illuminators 104 (e.g., LEDs) that it is listening to the person.

In some implementations, the electronic device 202 obtains (848) second audio signals by concurrently receiving second audio data at each microphone of the plurality of microphones 314.

In some implementations, in accordance with obtaining second audio signals, the electronic device 202 determines (850) based on the second audio signals that a second person is speaking in a vicinity of the electronic device 202. In some implementations, in accordance with the determination based on the second audio signals that a second person is speaking in a vicinity of the electronic device 202, the electronic device 202 determines (852) whether the second person is within the field of view of the image sensor.

In some implementations, in accordance with the determination that the second person is within the field of view of the image sensor, the electronic device 202 attends (854) to the second person by directing the image sensor (e.g., camera(s) 319) and the display 328 toward the second person.

In some implementations, in accordance with the determination that the second person is not within the field of view of the image sensor, the electronic device 202 reorients (856) itself based on differences in the second audio data received at respective microphones of the plurality of microphones 314. In some implementations, after the electronic device 202 reorients itself based on differences in the second audio data, the electronic device 202 determines (858) that the second person is not visible to the electronic device 202. In some implementations, in accordance with the determination that the second person is not visible, the electronic device 202 indicates (860) via the display 328 that the second person is not visible. In some implementations, in accordance with the determination that the second person is not visible, the electronic device 202 outputs a response (e.g., an audio response) indicating to the person that the person is not visible.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

It will also be understood that, although the terms first, second, etc. are, in some instances, used herein to describe various elements, these elements should not be limited by these terms. These terms are only used to distinguish one element from another. For example, a first electronic device could be termed a second electronic device, and, similarly, a second electronic device could be termed a first electronic device, without departing from the scope of the various described implementations. The first electronic device and the second electronic device are both electronic devices, but they are not the same type of electronic device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. An electronic device comprising:
   an image sensor;
   a display;
   an actuator;
   at least one microphone;
   a speaker; and
   a processor interfacing with the image sensor, the display, the actuator, the at least one microphone, and the speaker, and configured to:
   obtain a set of audio signals from the at least one microphone,
   determine that the set of audio signals include speech spoken by a first person,
   obtain video data from the image sensor,
   determine, based on an analysis of the set of audio signals and the video data, that the first person is not within a field of view of the image sensor,
   cause the actuator to rotate the display about an axis while a portion of the electronic device comprising the speaker does not rotate, after causing the actuator to rotate the display about the axis, obtain second video data from the image sensor, and determine, based on an analysis of the second video data, that the first person is within the field of view of the image sensor.

2. The electronic device of claim 1, wherein the processor is further configured to:

after determining that the first person is not within the field of view, determine a preferred direction for reorienting on the first person;

and wherein the processor causes the actuator to rotate the display about the axis in the preferred direction.

3. The electronic device of claim 2, wherein to determine the preferred direction, the processor is configured to:

determine the preferred direction based on a set of properties of the set of audio signals obtained from the at least one microphone.

4. The electronic device of claim 2, wherein to determine the preferred direction, the processor is configured to:

identify a position of a surface in a vicinity of the electronic device, the surface having reflected at least a portion of the set of audio signals obtained from the at least one microphone, and determine the preferred direction based on the position of the surface.

5. The electronic device of claim 2, further comprising:

a memory storing a layout of a room in which the electronic device is located; and wherein to determine the preferred direction, the processor is configured to:

determine the preferred direction based on the layout of the room.

6. The electronic device of claim 2, wherein to determine the preferred direction, the processor is configured to:

create a set of audio beams from the set of audio signals obtained from the at least one microphone, and determine the preferred direction based on an audio beam of the set of audio beams having the highest signal-to-noise ratio.

7. The electronic device of claim 1, wherein the at least one microphone comprises a plurality of microphones, wherein the processor is further configured to:

determine a set of differences in the set of audio signals obtained from respective microphones of the plurality of microphones;

and wherein the processor causes the actuator to rotate the display about the axis based on the set of differences in the set of audio signals.

8. The electronic device of claim 1, wherein the processor is further configured to:

center the first person within the field of view of the image sensor.

9. The electronic device of claim 1, wherein the processor causes the actuator to rotate the display about two axes while the portion of the electronic device comprising the speaker does not rotate.

10. A computer-implemented method of reorienting a display of an electronic device, the computer-implemented method comprising:

obtaining, by a processor, a set of audio signals from at least one microphone;

determining, by the processor, that the set of audio signals include speech spoken by a first person;

obtaining, by the processor, video data from an image sensor;

determining, based on an analysis of the set of audio signals and the video data, that the first person is not within a field of view of the image sensor;

rotating, by an actuator, the display about an axis while a portion of the electronic device comprising a speaker does not rotate;

after rotating, by the actuator, the display about the axis, obtaining, by the processor, second video data from the image sensor; and determining, based on an analysis of the second video data, that the first person is within the field of view of the image sensor.

11. The computer-implemented method of claim 10, further comprising:

after determining that the first person is not within the field of view, determining, by the processor, a preferred direction for reorienting on the first person;

and wherein rotating the display comprises:

rotating, by the actuator, the display about the axis in the preferred direction.

12. The computer-implemented method of claim 11, wherein determining the preferred direction comprises:

determining, by the processor, the preferred direction based on a set of properties of the set of audio signals obtained from the at least one microphone.

13. The computer-implemented method of claim 11, wherein determining the preferred direction comprises:

identifying, by the processor, a position of a surface in a vicinity of the electronic device, the surface having reflected at least a portion of the set of audio signals obtained from the at least one microphone; and determining, by the processor, the preferred direction based on the position of the surface.

14. The computer-implemented method of claim 11, wherein determining the preferred direction comprises:

determining, by the processor, the preferred direction based on a layout of a room in which the electronic device is located.

15. The computer-implemented method of claim 11, wherein determining the preferred direction comprises:

creating, by the processor, a set of audio beams from the set of audio signals obtained from the at least one microphone; and determining, by the processor, the preferred direction based on an audio beam of the set of audio beams having the highest signal-to-noise ratio.

16. The computer-implemented method of claim 10, wherein the at least one microphone comprises a plurality of microphones, wherein the method further comprises:

determining, by the processor, a set of differences in the set of audio signals obtained from respective microphones of the plurality of microphones; and wherein rotating the display about the axis comprises:

rotating, by the actuator, the display about the axis based on the set of differences in the set of audio signals.

17. The computer-implemented method of claim 10, further comprising:

centering the first person within the field of view of the image sensor.

18. The computer-implemented method of claim 10, wherein rotating the display about the axis comprises:

rotating, by the actuator, the display about two axes while the portion of the electronic device comprising the speaker does not rotate.

19. A non-transitory computer readable storage medium storing one or more programs, the one or more programs comprising instructions, which, when executed by an electronic device, cause the electronic device to perform operations comprising:
- obtaining a set of audio signals from at least one microphone;
- determining that the set of audio signals include speech spoken by a first person;
- obtaining video data from an image sensor;
- determining, based on an analysis of the set of audio signals and the video data, that the first person is not within a field of view of the image sensor;
- rotating a display of the electronic device about an axis while a portion of the electronic device comprising a speaker does not rotate;
- after rotating the display about the axis, obtaining second video data from the image sensor; and
- determining, based on an analysis of the second video data, that the first person is within the field of view of the image sensor.

20. The non-transitory computer readable storage medium of claim 19, the instructions, which, when executed by the electronic device, cause the electronic device to perform operations further comprising:
- after determining that the first person is not within the field of view, determining a preferred direction for reorienting on the first person;

and wherein rotating the display comprises:
- rotating the display about the axis in the preferred direction.

* * * * *